US006622307B1

(12) United States Patent
Ho

(10) Patent No.: US 6,622,307 B1
(45) Date of Patent: Sep. 16, 2003

(54) MULTIPLE-ROOM SIGNAL DISTRIBUTION SYSTEM

(75) Inventor: Kesse Ho, Westminster, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/277,471

(22) Filed: Mar. 26, 1999

(51) Int. Cl.$^7$ .............................. H04N 7/20; H04N 7/18; H04N 7/173; H04N 7/16
(52) U.S. Cl. ........................... 725/120; 725/71; 725/78; 725/80; 725/82; 725/149; 725/121
(58) Field of Search .............................. 725/71, 78, 80, 725/85, 120, 149, 65, 79, 82, 121, 130

(56) References Cited

U.S. PATENT DOCUMENTS

| | | | | |
|---|---|---|---|---|
| 4,885,803 A | * | 12/1989 | Hermann et al. ............ 455/603 |
| 5,521,631 A | * | 5/1996 | Budow et al. .................. 348/7 |
| 5,572,517 A | * | 11/1996 | Safadi ......................... 370/50 |
| 5,708,961 A | * | 1/1998 | Hylton et al. ................ 455/4.2 |
| 5,787,335 A | * | 7/1998 | Novak ......................... 455/3.2 |
| 5,805,806 A | * | 9/1998 | McArthur ................ 395/200.8 |
| 5,835,128 A | * | 11/1998 | Macdonald et al. ........... 348/8 |
| 5,905,941 A | * | 5/1999 | Chanteau .................... 455/3.2 |
| 5,905,942 A | * | 5/1999 | Stoel et al. .................. 455/4.2 |
| 5,936,660 A | * | 8/1999 | Gurantz ....................... 348/10 |
| 6,038,425 A | * | 3/2000 | Jeffrey ........................ 455/3.1 |
| 6,104,908 A | * | 8/2000 | Schffner et al. ............. 455/3.2 |
| 6,134,419 A | * | 10/2000 | Williams ..................... 455/6.2 |
| 6,147,714 A | * | 11/2000 | Terasawa et al. ........... 348/564 |
| 6,192,399 B1 | * | 2/2001 | Goodman .................... 709/217 |
| 6,486,907 B1 | * | 11/2002 | Farber et al. .................. 348/8 |

* cited by examiner

Primary Examiner—Andrew Faile
Assistant Examiner—Son P. Huynh
(74) Attorney, Agent, or Firm—John A. Crook; Michael W. Sales

(57) ABSTRACT

A multiple-room communication system is adapted to provide digital television programming (e.g. DBS) to a plurality of rooms in a single family dwelling and may be further adapted to provide digital television programming to a plurality of dwelling units in a multiple dwelling unit such as an apartment. A central unit includes a plurality of integrated receiver decoder modules that receive e.g. satellite signals from a satellite antenna and filter and supply the signals to a distribution system that is coupled to a plurality of display devices that are located in various rooms throughout the single family home. A plurality of hand-held remote controllers, each being associated with one of the integrated receiver decoder modules, are used to communicate with and control the associated integrated receiver decoder module to cause it to supply a desired signal to a desired display device. Each of the remote controllers are adapted to ensure exclusive communication with the associated integrated receiver decoder module and to prevent interference with the operation of the other integrated receiver decoder modules. A single power supply is used to power the co-located integrated receiver decoder modules, and a single modem is used to report billing information to the satellite provider.

33 Claims, 13 Drawing Sheets

Prior Art

MULTIPLE-ROOM SIGNAL DISTRIBUTION SYSTEM

BACKGROUND OF THE INVENTION (a) Field of the Invention

This invention relates in general to a signal distribution system. More particularly, it relates to a multiple-room signal distribution system that enables the efficient and cost effective distribution of a received wide band high frequency signal to different areas of a single general location (e.g., different rooms/floors of a single family unit, or different units/floors of a multiple-dwelling-unit).

(b) Description of Related Art

Audio/visual/data (AVD) signal distribution systems generally rely on either a cable network or on free-space propagation to deliver AVD signals, such as television signals, to individual users or subscribers. Cable-based AVD signal distribution systems transmit one or more individual AVD signals or "channels" over wire, while free-space propagation systems transmit one or more channels through free-space, i.e., in a wireless manner. Most large-scale cable and wireless signal distribution systems broadcast a broadband AVD signal having a plurality of individual AVD signals modulated onto one or more carrier frequencies within a discernable frequency band.

As an introduction to a signal broadcasting system that is capable of incorporating and utilizing the signal distribution system of the present invention, FIG. 1 illustrates at 20 one example of a known wireless AVD signal broadcasting system. The illustrated broadcasting system 20 represents a Direct-to-Home (DTH) satellite communication system 20 having, generally, a transmission station 22, a relay 24, and a plurality of receiver stations, one of which is shown at reference numeral 26. A wireless free-space link provides the communications medium between the transmission station 22, the relay 24, and the receiver station 26. The transmission station 22 includes programming sources 28, control data sources 30, program guide (PG) data sources 34, audio/video/data encoding systems 36, uplink frequency converters 38, and uplink antennas 40. The relay 24 is preferably at least one geosynchronous or geo-stationary satellite. The receiver station 26 shown in FIG. 1 includes a reception antenna/dish 50, a low-noise-block (LNB) 52 connected to the antenna 50, an integrated receiver/decoder (IRD) 54, and a video display device (e.g., television) 60.

In operation, the program source 28 receives video and audio programming from a number of sources, including satellites, terrestrial fiber optics, cable, or tape. The received programming signals, along with data signals from the control data source 30 and program guide (PG) data source 34, are sent to the audio/video/data encoding system 36 where they are digitally encoded and multiplexed into a packetized data stream using a number of conventional algorithms. In a conventional manner, the encoded data stream is modulated and sent through the uplink frequency converter 38 which converts the modulated encoded data stream to a frequency band suitable for reception by the relay/satellite 24. Preferably, the satellite frequency is Ku-band. The modulated, encoded data stream is then routed from the uplink frequency converter 38 to an uplink satellite antenna/dish 40 where it is broadcast toward the satellite 24 over the free-space link. The satellite 24 receives the modulated, encoded Ku-band data stream and re-broadcasts it downward toward an area on earth that includes the various receiver stations 26. The LNB 52 of each receiver station 26 shifts the Ku-band signal down to an L-band signal which is conveyed from the LNB 52 to the IRD 54.

Continuing with further details of the signal broadcasting system 20, FIG. 2 illustrates a more detailed diagram of the receiver station 26 shown in FIG. 1.

As shown, the receiver station 26 includes the antenna 50, the LNB 52, and the IRD 54 which is connected to a display 60 (see FIG. 1). The satellite antenna 50 transfers the received satellite signal to a conventional LNB circuit 52 which then passes the signal to the IRD 54. The IRD 54 includes a tuner 56, a demodulator 58, an FEC decoder 62, a microprocessor 64, a transport IC 66 having a channel demultiplexer 68, a decryption circuit 70, a conditional access module 72, an access card reader 74, a system RAM 76, an audio/video decoder circuit 78 having a random-access-memory (RAM) 80, an audio decoder 82, a video decoder 84, an audio digital-to-analog converter 86, an NTSC encoder 88, an output driver 90, a modem connection 92, a set of microprocessor peripherals 91 (optional), a front panel user interface 94, and a power supply 96, coupled together as illustrated.

The transport IC 66 receives the transport stream of digitized data packets containing video, audio, scheduling information, and other data. The digital packet information contains identifying headers as part of its overhead data. Under control of the microprocessor 64, the channel demultiplexer 68 filters out packets that are not currently of interest, and routes the data packets that are of interest through the decryption circuit 70 and the conditional access module 72 to their proper downstream destination. The decryption circuit 70 provides decryption for the data packets that have been encrypted. The conditional access module 72 provides access control by any conventional means. For example, access control may be achieved by requiring a data packet to have a proper authorization code in order to be passed to the decryption circuit 70 and/or the video decoder 78. The access card reader 74 can interface with an access card (not shown) that will receive the packet authorization code, determine its validity, and generate a code that confirms to the transport IC 66 that the subject data packet is authorized. The conditional access module 72 also contains information necessary to perform a call back operation in which the microprocessor causes the modem 92 to call the satellite provider periodically to report data. The reported data is used for billing purposes and includes information regarding the programs and services that the viewer has accessed via the IRD module 54. Various authorization codes required to perform the callback feature and used to inform the microprocessor 64 as to when callback is desired are determined via the conditional access module 72.

The authorized data of interest are stored in the system RAM 76 for buffering, and the audio/video decoder 78 requests (via the microprocessor 64) the RAM 76 contents as needed. The requested data is routed from the RAM 76 through the transport IC 66 to the audio/video decoder 78. If the request is for video data, video data in the RAM 76 are routed through the transport IC 66 to the video/audio decoder's DRAM 80 until it is time for the data to be decoded. At that time, the data is routed to the video decoder 84 (which includes on-screen display circuitry) and the NTSC encoder 88. The video decoder 84 reads in the compressed video data from the DRAM 80, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the DRAM 80. At a later time, the image is read out of the frame buffer in the DRAM 80 and passed through the on-screen display circuitry to the NTSC encoder 88. The on-screen display circuitry (located in the video decoder 84) generates the graphics that allow text such as the electronic program guide data to be displayed. The NTSC encoder 88 converts the digital video signals to analog according to the NTSC standard or any other compatible standard, thereby allowing video to be received by and displayed on the display 60 (see FIG. 1).

Turning now to the problems faced and addressed by the signal distribution system of the present invention, to accommodate the viewing tastes of one or more persons simultaneously, it is desirable to be able to receive selected satellite programming at one antenna, and to distribute programming/data in the received satellite signal independently to a plurality of displays/televisions located in separate areas (e.g., separate rooms or floors) of a single family home or multiple-dwelling-unit. Previous systems have been proposed for accomplishing this. In one such system, two IRD units are attached to a single satellite antenna wherein each IRD independently provides selected programming to its associated display/television. The satellite antenna couples the received satellite television signal to a dual-LNB having two LNB circuits for independently routing the required received signal (e.g. polarization) via separate cables to two IRDs located in different rooms/floors of a single family home.

The above-described known system becomes more complicated if the received signal is to be distributed to three or more IRDs (e.g., a single family home having three or more televisions or, more commonly, multiple dwelling units such as apartments, or condos). In this situation, it is known to configure the dual LNB to output a left-hand circularly polarized (LHCP) satellite signal component and a right hand circularly polarized (RHCP) satellite signal component. The LHCP and RHCP components are then routed via separate cables to one or more multiswitches, which in turn routes a selected polarization signal individually to each of a plurality of IRDs. Other systems couple the LNB output to the multiswitch using a single cable approach, wherein the RHCP satellite signal is transmitted at a frequency between 950–1450 MHz and the left hand signal is remodulated to occupy the bandwidth between 1525–2025 MHz, thereby allowing single cable transmission.

The need for a dedicated IRD for each service area (i.e., room or apartment) in existing satellite distribution systems increases cost and complexity. For example, a conventional IRD includes several relatively costly components, including a modem circuit for transmitting billing data (via PSTN telephone connection) to the satellite provider, a power supply, conditional access circuitry and its own protective case. In addition, each IRD requires access to a telephone line connection to support modem communication thereby adding phone-line installation costs. Moreover, the telephone service required to support the call back feature of the IRDs can be quite costly. This may not be cost effective for multiple-room single family home applications.

Installing a home-wide or building-wide cable network capable of distributing the wide L-band 950–1450 MHz signal would be costly. Moreover, such satellite distribution systems are often a source of satellite signal degradation due to improper crimping of the connectors commonly used in the installations. It would therefore be advantageous for a satellite signal distribution system to take advantage of existing communications wiring that may be present in a given home or multiple-dwelling-unit. For example, many homes/buildings are already wired with a cable distribution network designed for distributing relatively narrow-bandwidth cable television signals. However, because the typical cable distribution network was designed specifically for distributing a narrower bandwidth, low frequency cable TV signal, these cables tend to cause amplitude attenuation when they are used to transport relatively wide bandwidth high frequency satellite signals.

One approach to solving the problem of distributing wide L-band satellite signals over existing narrower-band cables has been utilized in various travel industry applications (e.g., hotels, ships, airplanes, trains, etc.). For example, in a cruise ship application, such systems typically employ a plurality of IRDs residing at a common location such as a restricted access cabin on the ship. Each IRD is tuned to receive a single, unique channel, and each IRD includes a radio frequency ("RF") modulator for converting the received satellite signal to an RF modulated signal that is better suited for transmission to the ship's cabins over the single cable of the ship's cable TV distribution network. A television in each cabin includes a tuner that selects between the various channels provided via the single cable. However, such systems have limited versatility because, although the cabin viewer may control the tuner residing within their own TV set to receive a channel, the viewer is not able to control the IRD, and is therefore only able to receive one of the channels to which the IRDs are pre-tuned. Moreover, the number of channels received is limited by the number of IRDs installed in the system.

Accordingly, there is a need for a multiple-room, multiple-unit signal distribution system that overcomes the above-described shortcomings of known signal distribution systems. More particularly, there is a need for a signal distribution system that receives a broadcast wide bandwidth high frequency signal at a single input point (e.g., a satellite antenna) and enables the efficient and cost effective distribution of the received wide band high frequency signal to different areas of a single general location (e.g., different rooms/floors of a single family unit, or different units/floors of a multiple-dwelling-unit).

SUMMARY OF THE INVENTION

The present invention is embodied in a multiple-room, multiple-unit signal distribution system that overcomes the above-described shortcomings of known signal distribution systems. More particularly, the present invention is embodied in a signal distribution system that receives a broadcast wide bandwidth signal at a single input point (e.g., a satellite antenna) and enables the efficient and cost effective distribution of the received wide band high frequency signal to different areas of a single general location (e.g., different rooms/floors of a single family unit, or different units/floors of a multiple-dwelling-unit). The disclosed signal distribution system can utilize existing relatively narrow bandwidth low frequency cable networks found in many single family homes and multiple-dwelling-units.

A multiple-room, multiple-unit signal distribution system embodying the present invention is adapted to provide access to multichannel digital subscription satellite television programming to a plurality of rooms in a single family dwelling, and may be further adapted to provide satellite television programming to a plurality of dwelling units in a multiple dwelling unit such as an apartment. A plurality of integrated receiver decoder modules supported by a common chassis receive satellite signals from a satellite antenna and filter and supply the signals to a distribution system that is coupled to a plurality of display devices that are located in various rooms throughout the single family home (or to various apartment units in an MDU). A plurality of handheld remote controllers, each being associated with one of the integrated receiver decoder modules, are used to communicate with and control the associated integrated receiver decoder modules to cause each to supply a desired signal to a desired display device. Each of the remote controllers is adapted to ensure exclusive communication with the associated integrated receiver decoder module and to prevent interference with the operation of the other integrated receiver decoder modules, either permanently, configurably, or by user selection. A single power supply is preferably used to power the co-located integrated receiver decoder modules, and a single modem, is preferably used to report billing information to the satellite provider for each of the modules.

Accordingly, the present invention may be utilized in a transmission system in which information signals are transmitted to a plurality of user locations, wherein each of the user locations includes a plurality of service areas therein. An information signal distribution system at at least one of said user locations includes a central unit having a primary information signal input port that receives primary information signals, said primary information signals comprising a plurality of primary information signal components. The central unit further has at least one output port that outputs to a distribution network selected ones of said plurality of primary information signal components for distribution to each of the plurality of service areas. The central unit houses signal processing circuitry that receives said primary information signal, along with a plurality of coded user selection signals. The signal processing circuitry processing said primary information signal, based on said coded user selection signals, along a plurality of parallel and independent signal paths to independently and in parallel provide any one of said primary information signal components to said at least one output port. The coded user selection signals include a user selection component that identifies one of the plurality of primary information signal components. The user selection information further includes a coded portion that identifies one of said plurality of parallel and independent signal paths.

In the above-recited information signal distribution system, the at least one user location comprises a single family dwelling unit, and said plurality of service areas comprise rooms in said single family dwelling unit. Alternatively, the at least one user location comprises a multiple-dwelling-unit building, and said plurality of service areas comprise dwelling units of said multiple-dwelling-unit building.

The above-recited signal distribution system may further include a plurality of remote user interface units located in at least some of said service areas. The remote user interface units receive said coded user selection signals and provide them to said central unit.

The signal processing circuitry includes decoder modules for each of said plurality of parallel and independent signal paths. The decoder modules independently and in parallel decode said primary information signal to provide any one of said primary information signal components to said at least one output port. The signal processing circuitry further includes at least one shared-resources module that generates shared resources that are shared among said decoder modules. The shared resources may be power resources, conditional access resources that determine what primary information signal components said central unit is authorized to receive, and/or modem resources that provide access to a telephone line for transmitting information gathered by said central unit.

The signal processing circuitry further includes a signal combiner that combines the selected primary information signal components decoded by said decoder modules and provides a combined signal to said central unit output port and said distribution network.

The central unit can further include at least one auxiliary input port that receives auxiliary information signals. The signal combiner therefore also combines said auxiliary information signals such that said combined signal comprises said selected primary information signal components decoded by said decoder modules and said auxiliary information signal. The auxiliary information signal can be an off-air broadcast television signal, a cable television signal, and/or another signal source.

The primary information signal can be packetized streaming digital data comprising various channels of video/audio programming, and the primary information signal components can include the various channels of video/audio programming. The user selection component can include signals representing a user's selection of one of said various channels of audio/video programming.

The primary information signal can include a wide L-band signal, and each of said decoders comprise an agile RF modulator that modulates said primary information signal component to a narrow bandwidth signal.

BRIEF DESCRIPTION OF THE DRAWINGS

The invention will be better understood from the following detailed description taken in conjunction with the accompanying figures of the drawings, wherein.

DESCRIPTION OF THE PREFERRED EMBODIMENTS

Figure 1:
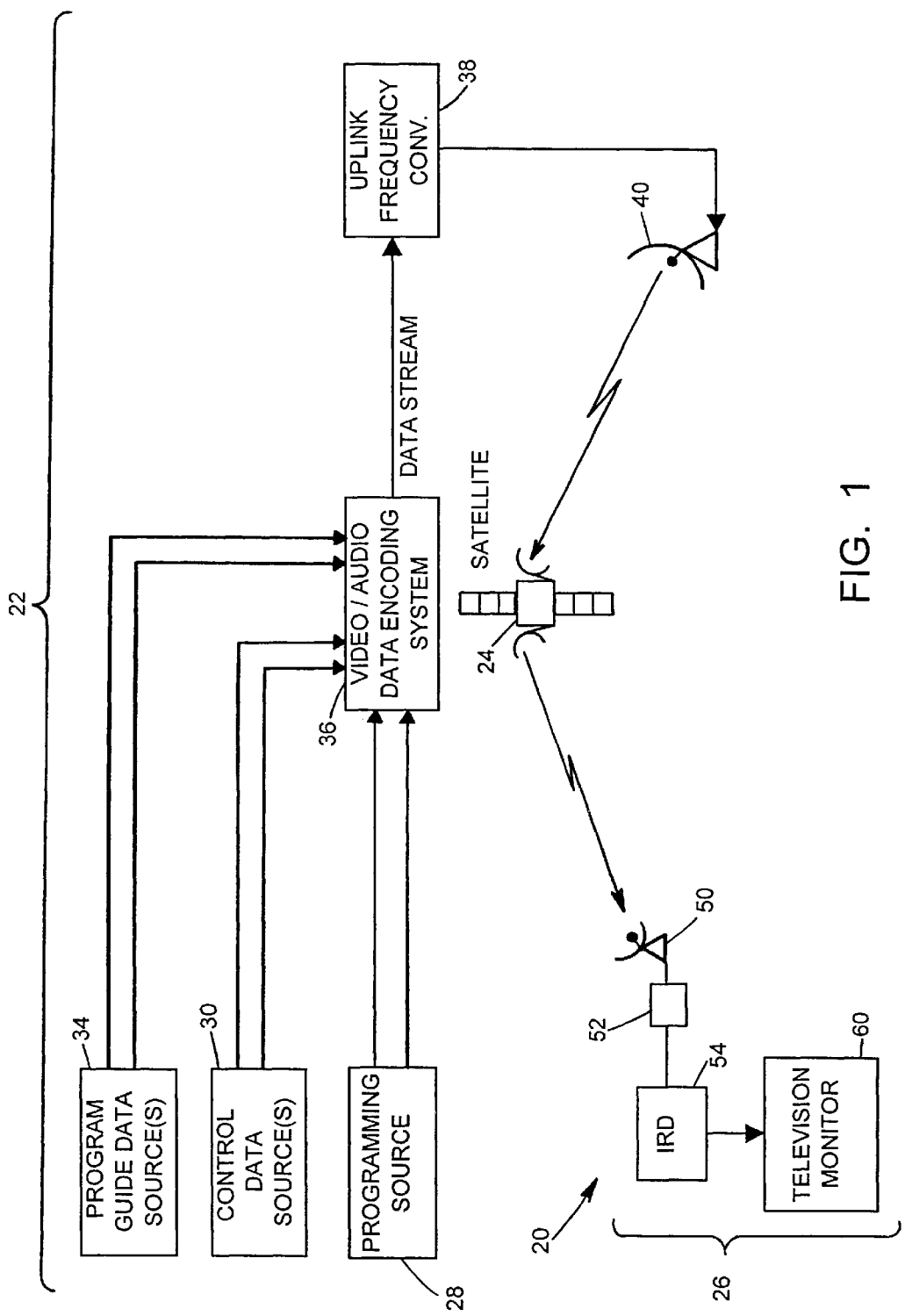
FIG. 1 is a diagram of a direct-to-home satellite system capable of utilizing the signal distribution features of the present invention.
Figure 2:
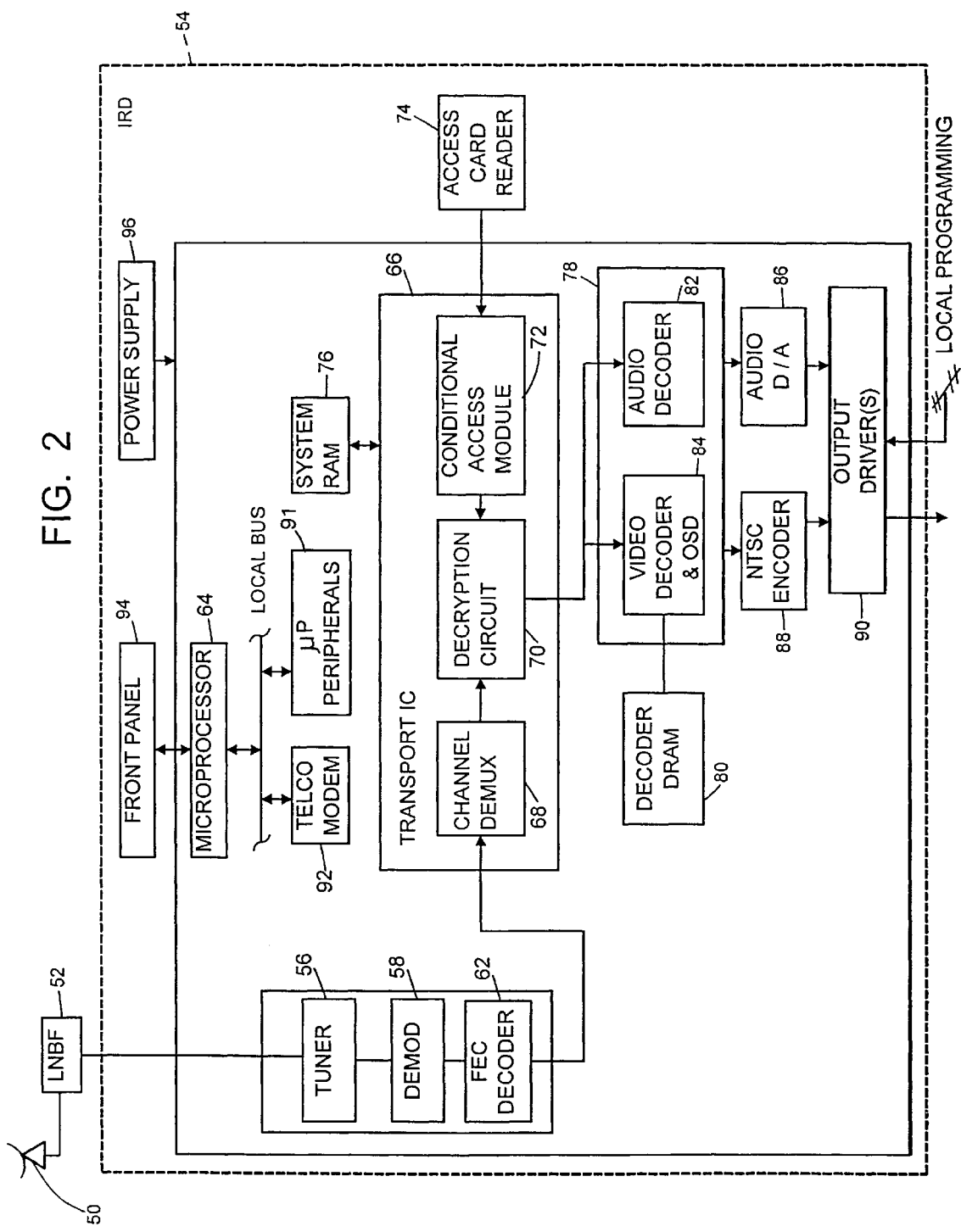
FIG. 2 is a more detailed block diagram of the receiver station and IRD illustrated in FIG. 1.

FIGS. 1 and 2 illustrate details of a signal broadcasting system that is capable of incorporating and utilizing the signal distribution system of the present invention. The illustrated system 20 represents a Direct-to-Home (DTH) satellite communication system 20 having, generally, a transmission station 22, a relay 24, and a plurality of receiver stations, one of which is shown at reference numeral 26. A wireless free-space link provides the communications medium between the transmission station 22, the relay 24, and the receiver station 26.

Although the disclosed embodiment(s) of the present invention will be described in the context of a high-powered DTH system of the type shown in FIGS. 1 and 2, it has applicability to other distribution systems as well. For example, digital cable or digital terrestrial broadcasting will also require complex receivers/decoders and, potentially, conditional access systems. Further, the modules may be of a similar type for processing signals of a given distribution network for viewing at different locations, or may be specialized to receive different signals for display at different locations for a given location. In this latter example, one module may process DTH satellite signals from a first broadcaster while another module processes terrestrial digital broadcast signals. By utilizing frequency agile modulators, these can be combined and output on a common cable and supplied to a distribution network throughout the home, for viewing at any location.

Figure 3:
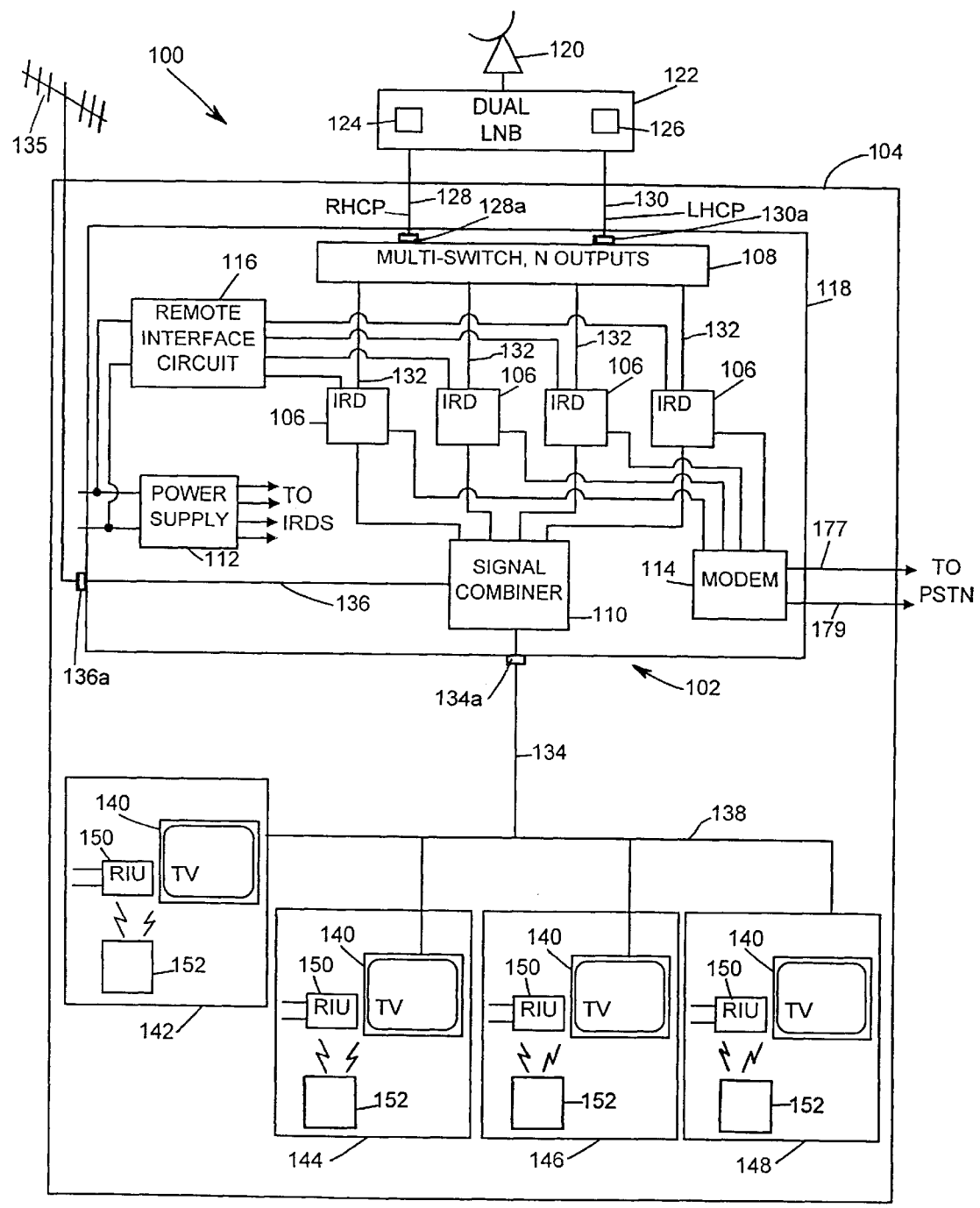
FIG. 3 is a block diagram of a first signal distribution system embodying the present invention.

Turning now to the disclosed embodiments, FIG. 3 shows a first multipleroom signal distribution system 100 embodying the present invention that is adapted for a single family dwelling 104. The system 100 includes a multiple integrated receiver/decoder (MIRD) unit 102 that includes a set of modified IRD modules 106, a multiswitch 108 having N outputs (where N is greater than or equal to the number of IRDs 106), a signal combiner 110, an AC-DC power supply 112, a modem 114 and a remote interface circuit 116 supported by a common chassis 118. A satellite antenna 120 provides an L-Band satellite signal to a dual low-block-noise (LNB) circuit 122 having a first and a second LNB circuit 124 and 126. A set of output lines 128, 130 that couple the LNB to the multiswitch 108 via input ports 128a and 130a are biased by the multiswitch 108 such that the first LNB circuit 124 receives and processes right-hand circularly polarized (RHCP) signals and the second LNB circuit 126 receives and processes left-hand-circularly-polarized (LHCP) signals. The multiswitch 108 is coupled to the modified IRD modules 106 via the output lines 132. For simplicity, only four modified IRD modules 106 are shown in FIG. 3, ideally though, the MIRD 102 and the chassis 118 may support in excess of four modified IRD modules 106 as may be necessary to meet the viewing preferences of the single family home 104 in which the MIRD 102 is installed. In operation, the modified IRD modules 106 generate one of two DC voltages to select either the left-hand or right-hand polarized signals. The voltages generated by the modified IRD modules 106 are impressed onto the multiswitch output lines 132 and bias the multiswitch 108 thereby causing it to transmit the selected polarized signal. It should be understood that, in manners well known in the art, other satellite signal selection signals may be used (such as, for example, a 22 kHz signal that selects between two differing satellite locations), alone or in combination with voltage select signals.

The modified IRD modules 106 process the received L-Band satellite signals and convert the L-Band signals to a radio frequency ("RF") modulated video signal containing satellite television programming that is suitable for transmission over an e.g. RG6 cable 134 used to deliver cable TV programming. Prior to transmission over the cable 134, the RF video signal is supplied to the signal combiner 110 which is used to combine the IRD-supplied satellite programming with off-air and/or cable TV programming signals that are provided by an antenna 135 on a separate feed line 136 to an input port 136a. The combined signal is then provided to an output port 134a for subsequent transmission via RG6 cable 134 to a home distribution network 138. The home distribution network 134 and 138 may be configured to include a single cable on which the combined signal is routed, in a serial manner, to multiple rooms in the single family dwelling. Or, the distribution network 134 and 138 may instead be configured in a manner commonly known as a home run wiring scheme wherein the combined signal is delivered via a single cable to a plurality of RG6 cables. The plurality of RG6 cables thereafter provide independent signal delivery paths by which the combined signal is delivered to a plurality of televisions 140 located in a plurality of rooms 142, 144, 146 and 148 in the single family home 104. Of course, it will be understood by one having ordinary skill in the art that the distribution system 138 may be configured to deliver the combined signal in a serial manner or via a home run wiring scheme or in any of a number of other ways known in the art.

To effect individualized control of the IRDs 106, each of the rooms 142, 144, 146 and 148 may be equipped with a Remote Interface Unit (RIU) 150 and a hand-held remote control 152. The remote control 152 and the RIU 150 in each of the rooms 142, 144, 146 and 148 are configured to control a different, selected one of the IRD modules 106 to cause the selected IRD 106 to provide a desired signal for display on the television 140 located in the same room.

It will be understood by one of ordinary skill in the art that the signal provided via the cable 134 may be delivered to other output devices such as, for example, computer monitors capable of displaying television programming, or audio equipment, in addition to or instead of a television set.

Figure 4A:
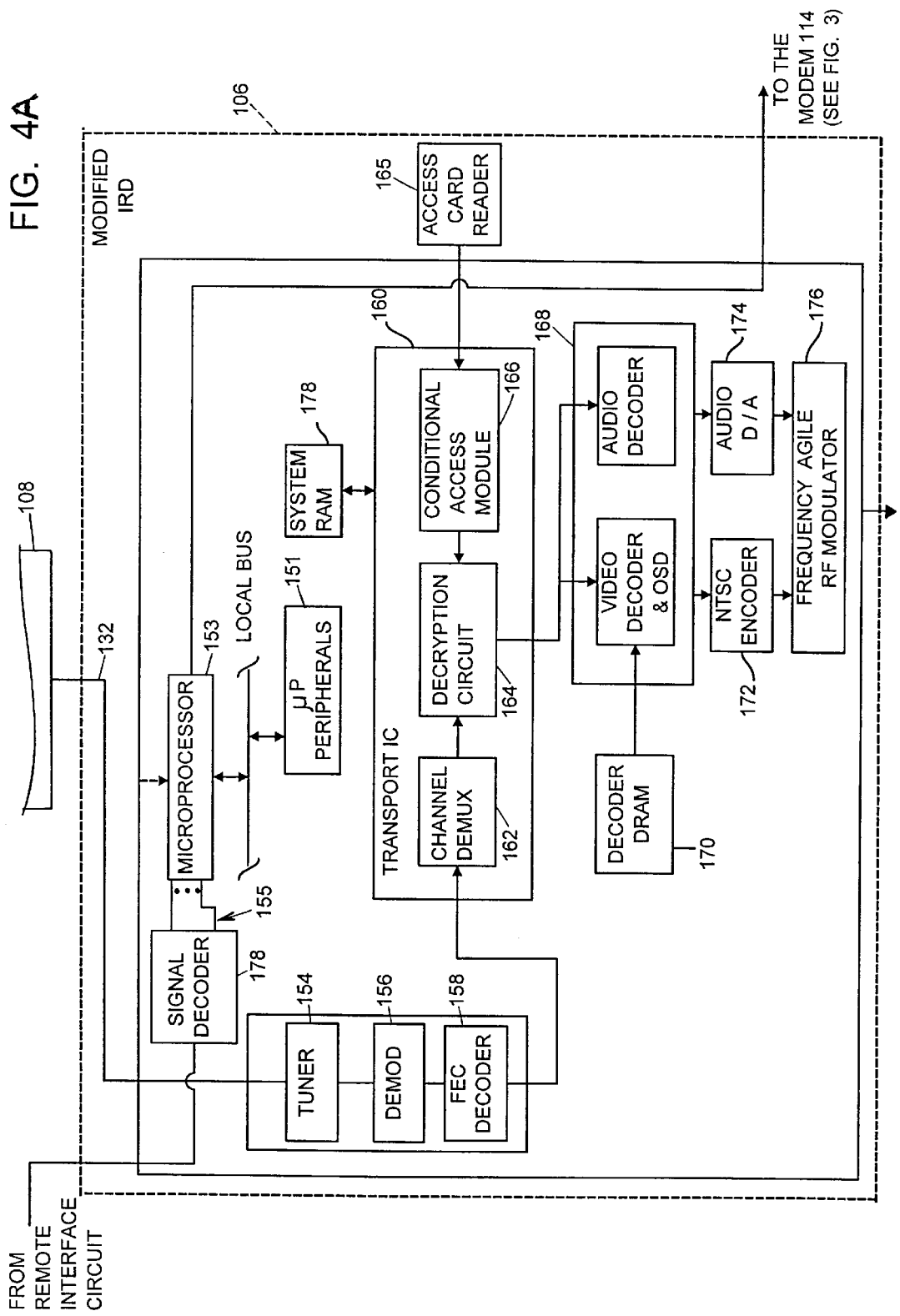
FIG. 4A is a block diagram illustrating, additional details of one of the modified IRD modules shown in FIG. 3.

Referring now to FIG. 4A, the modified satellite IRD modules 106 have a subset of the components found in the conventional satellite IRD module 54 shown in FIG. 2. In particular, the modified satellite IRD modules 106 include a microprocessor 153, a set of microprocessor peripherals 151 (optional), a tuner 154, a demodulator 156, an FEC decoder 158, a transport IC 160 having a channel demultiplexer 162, a decryption circuit 164 and a conditional access module 166, an access card reader 165, a video and audio decoder 168 with a DRAM 170, an NTSC encoder 172, an audio digital to analog converter 174 and a system RAM 178. As will be understood by one having ordinary skill in the art, the foregoing list of components all operate to process the satellite signals in the same manner as the IRD 54.

Referring now to FIGS. 2 and 4A, unlike the IRD 54 which is controlled by the microprocessor 64 via the front panel 94, the IRD 106 is controlled by the microprocessor 153 which receives control signals from a signal decoder 178. In response to these decoded signals, the microprocessor 153 directs the tuning circuits 154, 156 and 158 to impress source selection control signals, such as a voltage level that corresponds to either the left-hand or right-hand polarized signal, and/or control tone (frequency) that selects between multiple satellite locations, on the multiswitch output line 132 which causes the multiswitch 108 to provide the selected satellite signal to the IRD 106. Once received, the IRD 106 processes the signal in a manner similar to that described for the IRD 54 of FIG. 2.

Referring still to FIGS. 2 and 4A, unlike the IRD 54 which may include any generic output driver 90, in the IRD 106 the generic output driver 90 is a frequency agile RF modulator 176. The frequency agile RF modulator 176 is required to convert the NTSC encoded L-Band satellite signal to an RF-modulated output signal that occupies any selectable frequency band or channel, preferably one of the channels processed by standard consumer electronics devices (e.g., one of the following channel frequencies: UHF Channels 14–69 (470 MHz to 806 MHz) CATV channels 65–94 (469.25 MHz to 647.75 MHz), CATV channels 100–125 (649.25 MHz to 803.75 MHz). The conversion to RF enables the distribution of the video signal bearing the satellite television programing over the RG6 cable 134 (see FIG. 3). The RG6 cable 134 is standard equipment for the delivery of cable television and is, therefore, readily available in cable-ready single family homes. Thus, the present invention is well-suited for use with existing single family home cable TV distribution networks that provide multi-room distribution.

As described, prior to transmission the signal is combined with off-air and cable TV programming at the signal combiner 110 (see FIG. 3). Since it is not possible to provide signals supplied by more than one of the IRDs 106 on the same distribution frequency, each of the frequency agile RF modulators 176 converts the video signal to an unoccupied channel that differs from the channels used by the frequency agile modulators 176 residing at the other IRD modules 106, and that is not occupied by cable television or off-air programming signals. Thus, the IRD 106 equipped with a frequency agile RF modulator 176 enables distribution over the cable television distribution network 134 and 138 and further allows the output from the several IRD modules 106 to be combined and delivered on the same cable 134 and 138 without interference among the transmitted channels.

Referring now to FIGS. 3 and 4A, in the system of the present invention including multiple modified IRD modules 106, several of the redundant and costly internal components of the IRD 54 have been eliminated in the individual modules by replacing such components with one or at least a smaller number of shared resources within the MIRD 102. For example, unlike the conventional satellite IRD module 54, the modified IRD module 106 of the present invention does not, in preferred embodiments, include an internal power supply. Rather, the power supply 112 located in the MIRD 102 supplies power to all of the components residing in the MIRD 102. In addition, the modified IRD module 106 of the present invention does not, in preferred embodiments, include an internal telephone modem for reporting to the satellite provider. Instead, a single modem 114 residing in the MIRD 102 is coupled to the microprocessor 153 in each of the IRD modules 106. The modem 114 retrieves programming and billing information from the microprocessor 153 which, in turn, receives the information from the system RAM. The modem 114 reports the data via the telephone lines 177 and 179 to the satellite provider via the public switched telephone network ("PSTN"), thereby greatly reducing the number of telephone calls required to report billing data and the costs associated with the calls. Lastly, cost and space savings are realized by having the IRD modules 106 enclosed in a single chassis 118 thereby eliminating the need to house each IRD module 106 in a separate, bulky protective case that requires a front panel.

Of course, it will be appreciated by one of ordinary skill in the art that the telephone modem 114 may instead be replaced by another type of communication circuit capable of transmitting information to a communication network.

Figure 4B:
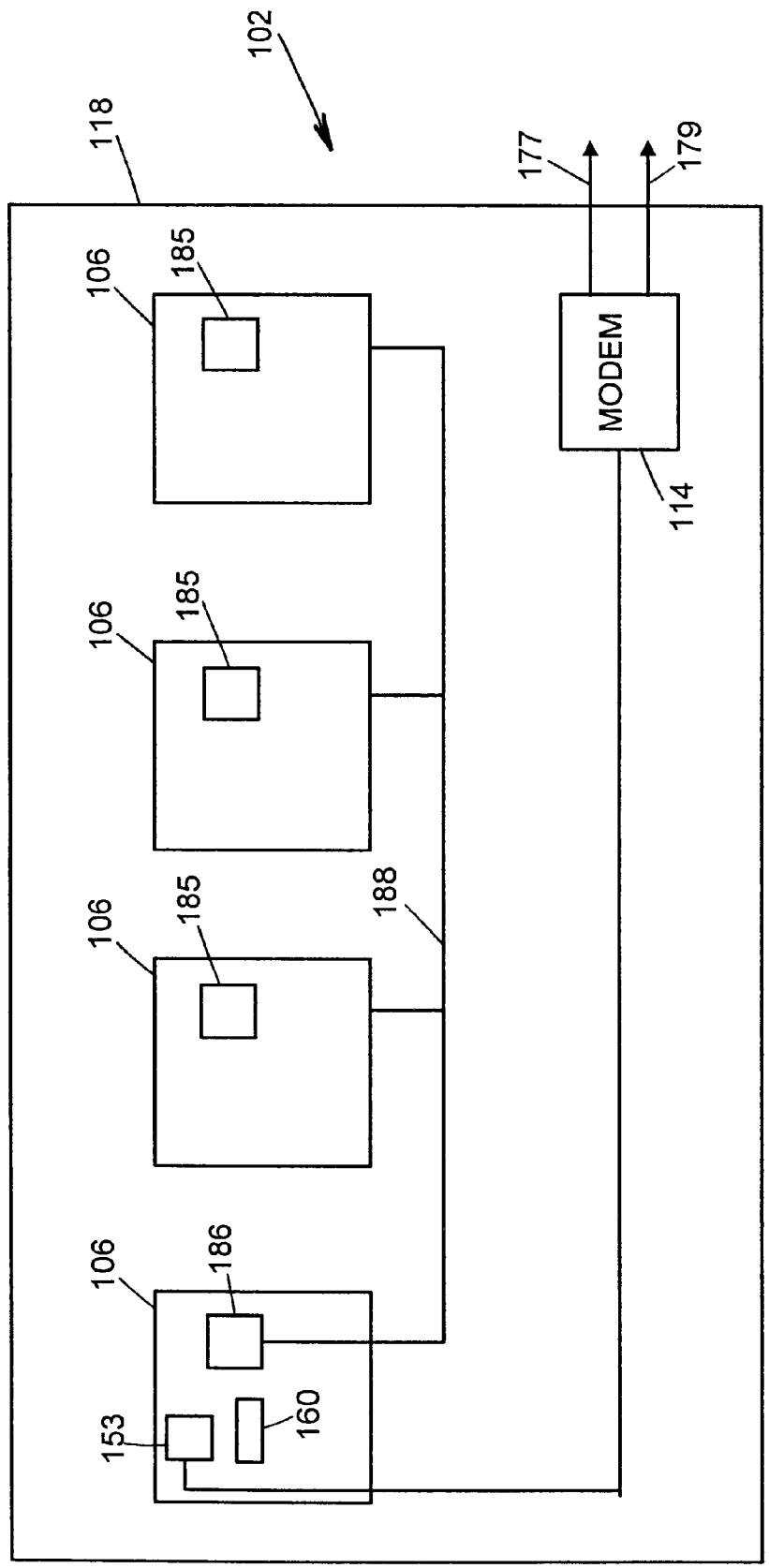
FIG. 4B is a block diagram illustrating additional details of the IRD modules shown in FIGS. 3 and 4A.

Referring now to FIGS. 4A and 4B, to further simplify the design of the IRD modules 106, the conditional access module 166 residing in three of the four IRD modules 106 may be replaced with a slave conditional access module 185 that is programmed to supply stored billing information and/or billing and access codes to a master conditional access module 186 residing in a fourth one of the four IRD modules 106. The master conditional access module 186 then communicates with the microprocessor 153 through the transport IC 160. The microprocessor 153, in turn, communicates with the modem 114 which communicates via the telephone lines 177, 179 with the satellite provider. To implement this master/slave configuration, the slave conditional access modules 185 are linked to the master conditional access module 186 via an IC$^2$ bus 188. The master/slave configuration of FIG. 4B reduces the number of phone calls that are required for reporting purposes and simplifies the MIRD 102 design by eliminating the need to individually connect each of the slave conditional access modules 185 to the modem 114. Alternatively, the chassis 118 itself may include sufficient components to support the conditional access function, including, for example, the master conditional access module 186. In this alternative embodiment, all of the modified IRD modules 106 would be equipped with slave conditional access modules. In a preferred further embodiment, the chassis 118 may include all components of an IRD 106 including the conditional access module and interfaces as well as supporting a number of additional modules, as described.

For single family homes having a home run wiring scheme wherein a plurality of cables are used to independently route the signals to separate rooms of the home, the present invention may be adapted by connecting each of the plurality of cables to the output of a separate one of the IRD modules 106. In this way, the output signal of each of the IRD modules 106 is separately routed to one of the rooms 142, 144, 146 and 148 in the single family home 104 rather than being provided in a combined signal that contains the output signal of all of the IRD modules 106. Since the output signal of each IRD 106 is independently routed, the need for the channel assigning capabilities of the frequency agile RF modulators 176 is eliminated. Thus, to reduce cost, the frequency agile modulators 176 may be replaced with less expensive conventional RF modulators, provided that the IRD modules 106 transmit at a channel that is not occupied by cable television or off air signals.

Dedicated or home run wiring is preferred in a multiple subscriber environment (such as a multiple dwelling unit) to prevent unauthorized access to signals and permit accurate billing for pay-per-view and other services. In a single family home, these issues are not generally applicable. Thus, a preferred embodiment in a single family home having home run wiring may be to utilize frequency agile modulators as previously described; multiplex the various signals; then distribute the multiplexed signal to some or all of-the rooms of the home. In this manner, each television can access not only the channel to which its corresponding (controlled) module is tuned (on its assigned channel), but also the outputs of all other modules (on their assigned channels). Where, for example, parents desire to limit a child's access to certain types of programming, the multiplexed signal distributed by the home run wiring run to certain locations may exclude the outputs of certain modules.

Referring again to FIG. 3, the home 104 is equipped with a cable distribution system 138 such that the output signals generated by each of the IRDs 106 are modulated to a separate, unique, otherwise unoccupied frequency by the frequency agile RF modulators 176 so that the programming generated by the IRD modules 106 may be provided in a combined signal to all of the television sets 140. In a distribution system 138 of this type, each of the unique channel frequencies are designated for display on a separate one of the television sets 140 located in the rooms 142, 144, 146 and 148. For example, the IRD 106 that is controlled by the RIU 150 located in the room 142 may transmit at UHF channel 30 whereas the IRD 106 controlled by the RIU 150 of the room 144 may output signals at UHF channel 34. Note that in a single family home VHF channels are preferably used for signal distribution since, typically, all VHF channels (e.g., channels 3–13) are occupied. To effect individualized control of the IRD modules 106 and, thus, control of the television sets 140, each of the hand-held remote control devices 152 communicates exclusively with the remote interface unit 150 residing in the same room as the television set 140 to be controlled. For example, the hand-held remote control device 152 residing in the room 142 communicates exclusively with the RIU 150 also residing in the room 142. Likewise, the handheld remote control device 152 and the RIU 150 residing in the room 144 communicate exclusively with each other. The RIUs 150 residing in each of the rooms 142, 144, 146 and 148, in turn, communicate with the remote interface circuit 116 of the MIRD 102. The remote interface circuit 116 then routes the signals originating from the remote control devices 152 to a corresponding one of the IRD modules 106. Thus, each of the remote control devices 152 and the RIUs 150 communicate with and control a single one of the IRD modules 106, exclusively.

Figure 5:
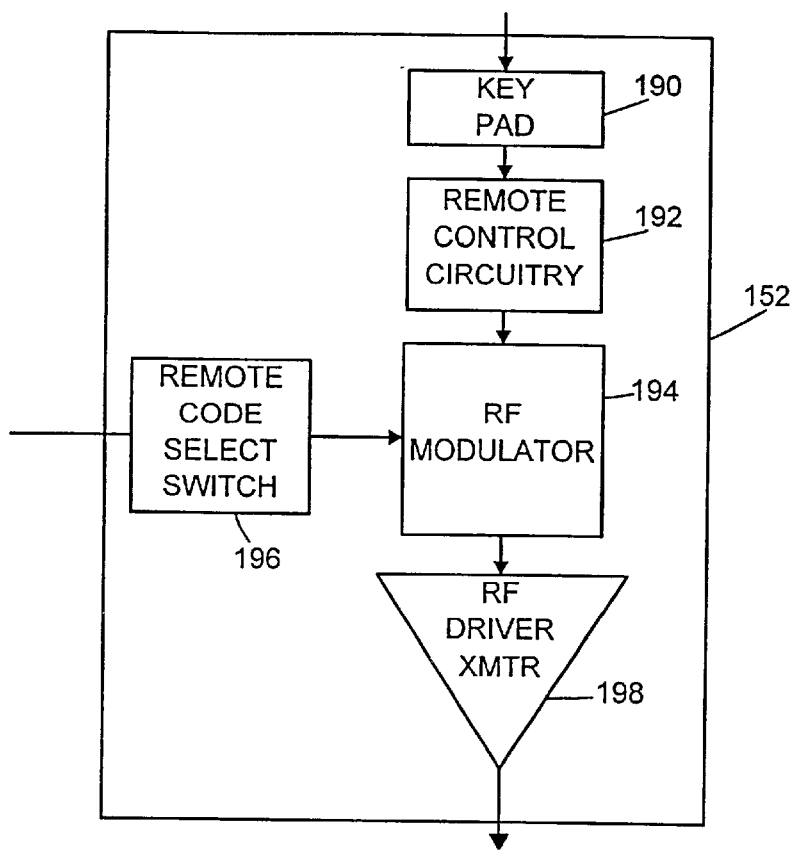
FIG. 5 is a block diagram of a hand held remote control unit for use with the signal distribution system shown in FIG. 3.

Referring also to FIG. 5, the hand-held remote control device 152 includes a key-pad 190 by which the viewer enters commands such as channel selections. The entered commands are then supplied to a remote control circuitry 192. The remote control circuitry 192 converts the entered commands to control signals that are then delivered to a signal adaptor such as a remote control RF modulator 194. The remote control RF modulator 194 converts the control signals to an RF frequency and is coupled to a remote code select switch 196 that may be implemented using, for example in preferred embodiments, a dip switch. The remote code select switch 196 is assigned a unique identifying code that is used to encode the modulated signals, which are then transmitted by an RF driver transmitter 198 to the corresponding RIU 150. Although an RF hand-held remote 152 is preferable because it need not be in the line of sight of the television 140 or the RIU 150 to effect communication, an IR hand-held remote control may instead be used. It will be understood by one having ordinary skill in the art that the remote control circuitry 192 required to convert the key pad-entered commands to control signals may be implemented using any of a number of standard remote control circuits that are currently available in commercially available television hand-held remote control units or any other such conversion circuitry adapted for integration into the hand-held remote control device 152.

Note that if an IR hand-held remote control unit 152 is used, then the handheld remote 152 need not be adapted to perform the unique signal encoding, rather, the encoding need only be performed by the RIU 150.

Figure 6:
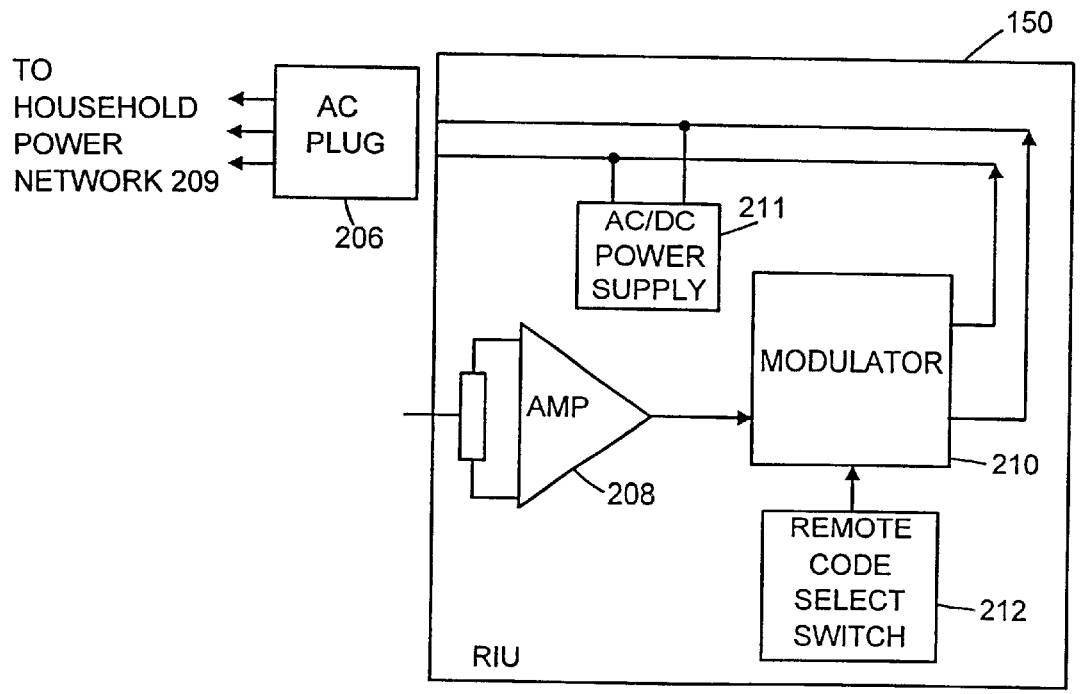
FIG. 6 is a block diagram illustrating additional details of the transceiver unit shown in FIG. 3, using household wiring to conduct control signals.

Referring now to FIGS. 3 and 6, the RIU 150 includes a three prong AC plug 206 for insertion into a standard house-hold electrical socket (not shown) and further includes a remote pickup RF amplifier 208 that receives the control signals transmitted by the RF driver transmitter 198 (see FIG. 5) of the remote control device 152 and provides the received signals to a remote control modulator 210. The remote control modulator 210 converts the control signals to a frequency suitable for transmission over the household power network 209. An AC/DC power supply 211 also coupled to the household power network 209 converts the AC power signal to a DC power signal that is thereafter used to bias the active components of the RIU 150. A remote code select switch 212 that has been assigned the same unique identifying code as the corresponding remote code select switch 196 (see FIG. 5) of the remote control device 152 is coupled to the remote control modulator 210 and restricts the signals to be converted to those bearing the proper identifying code.

Figure 7:
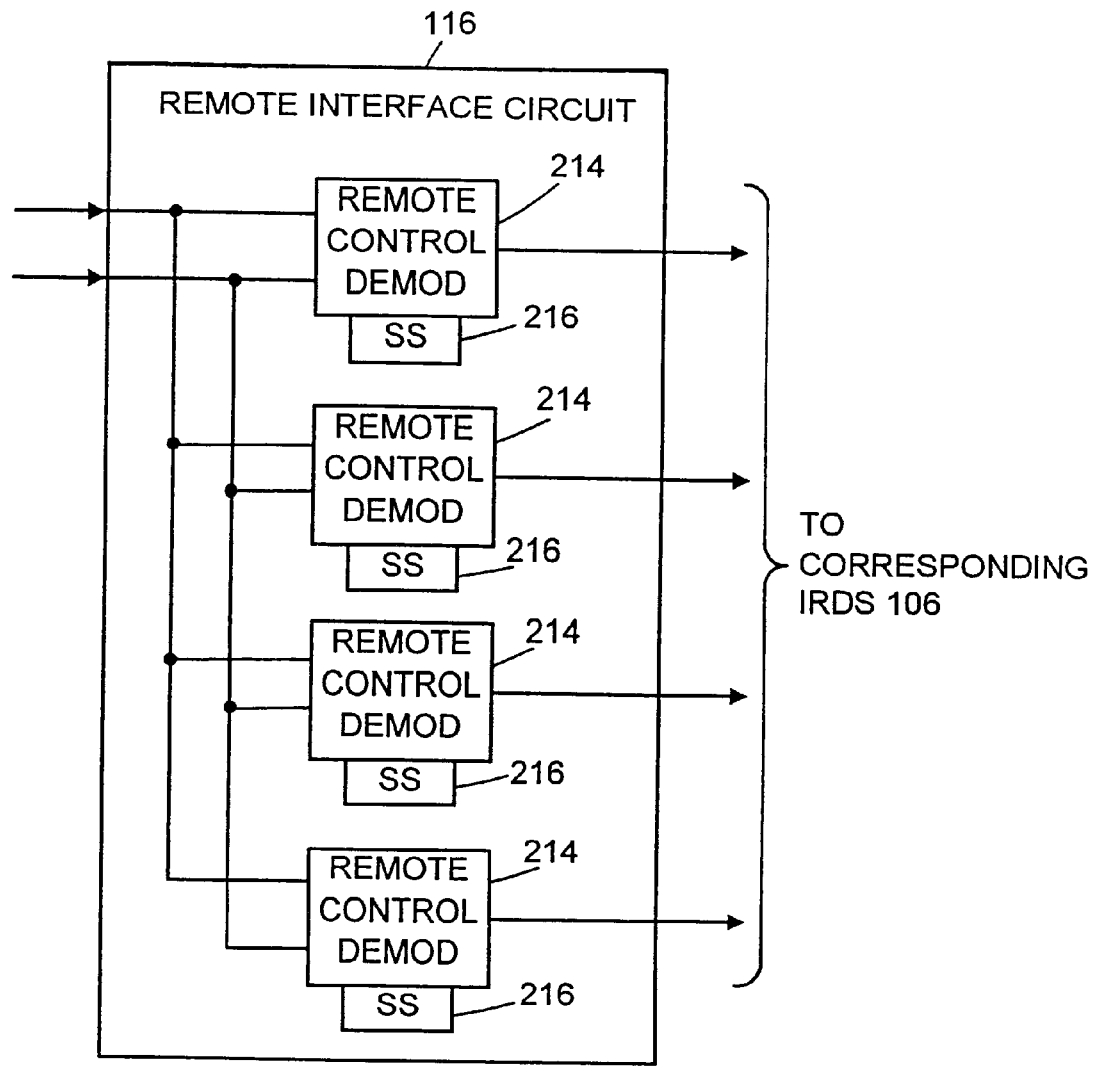
FIG. 7 is a block diagram illustrating additional details of the remote interface circuit shown in FIG. 3 using household wiring to conduct control signals.

Referring to FIGS. 3, 6 and 7, the encoded signals travel the household power network 209 and are then detected at the remote interface circuit 116 which includes a set of remote control demodulators 214 for demodulating the household power signal to extract the control signals. Each of the demodulators 214 is coupled to a remote code select switch 216 that has been assigned one of the unique identifying codes associated with one of the remote code select switches 212 residing in the RIUs 150 and that causes the demodulators 214 to convert only those signals bearing the proper code. Referring also to FIG. 4A, each of the demodulators 214 provides output to the signal decoder IC 178 disposed in the corresponding one of the IRD modules 106. The signal decoder IC 178 decodes the control signals and provides the decoded commands to a set of outputs 155 that are coupled to the microprocessor 153 residing in the IRD module 106 for which the signal is encoded. Thus, the uniquely coded remote code select switches 196 (see FIG. 5), 212 (see FIG. 6) and 216 (see FIG. 7) enable individualized control of the IRD modules 106. Note that, if desired, the decoded commands may also be provided to other components residing in the MIRD 102.

Alternatively, the control signals may instead be transmitted from the RIUs 150 to the MIRD 102 via the telephone lines 177, 179 or through the cable 134.

Figure 8:
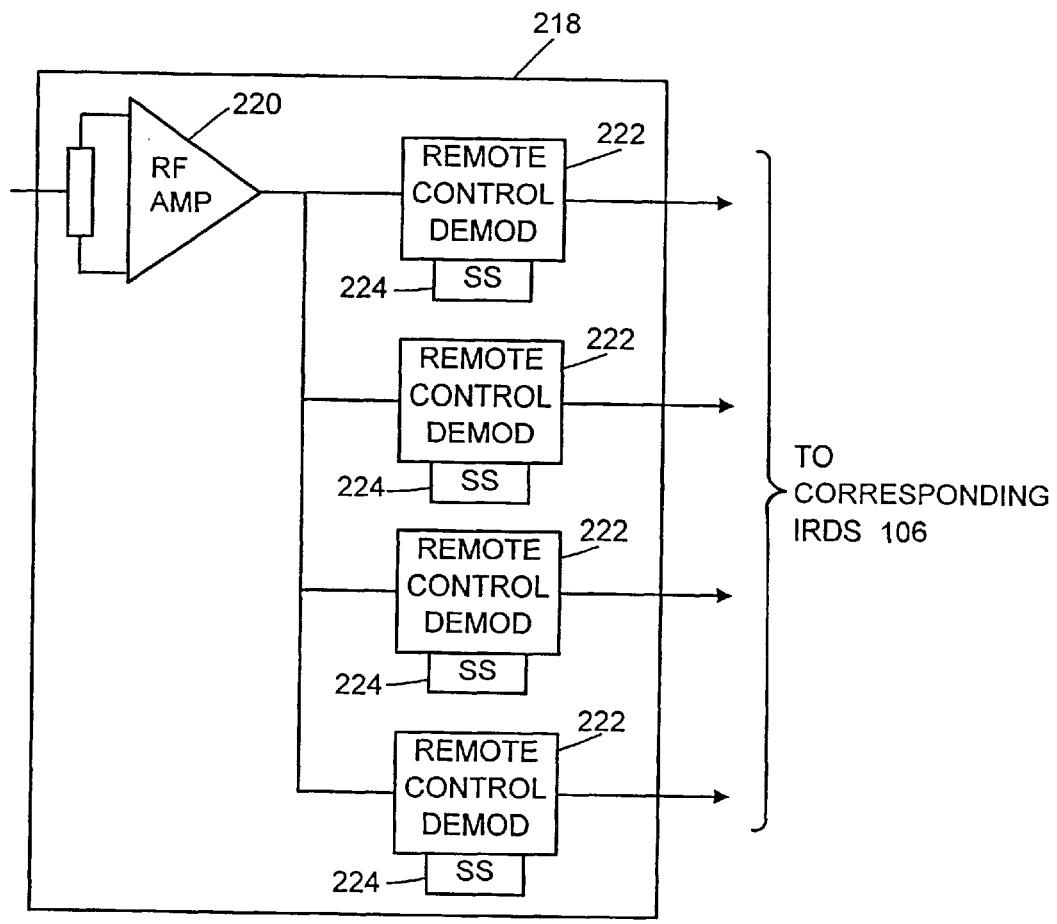
FIG. 8 is a block diagram of an alternate configuration of the remote interface circuit shown in FIG. 7.

Referring now to FIG. 5 and FIG. 8, in yet another embodiment, the hand-held remote controls 152 may communicate directly with the MIRD 102 thereby eliminating the need for the RIUs 150 provided that the hand-held remote controls 152 transmit RF-modulated signals rather than IR signals. To achieve direct communication between the hand-held remote control devices 152 and the MIRD 102, the remote interface circuit 116 of the embodiment shown in FIG. 7 is replaced with an RF remote interface circuit 218 shown in FIG. 8. The control signals transmitted by the hand-held remote control unit 152 are detected by an RF pick up amplifier 220 and thereafter supplied to a set of demodulators 222 that are each coupled to one of a set of remote code select switches 224. The remote code select switches 224 operate in the same manner as the remote code select switches 216 shown in FIG. 7, i.e., to restrict the signals processed by the remote demodulators 222 to those bearing the same code as the corresponding remote control device 152.

Referring also to FIG. 4A, each of the RF demodulators 222 supplies a demodulated signal to one of the signal decoders 178 disposed in the corresponding one of the IRD modules 106. As described herein, the decoder 178 decodes the control signals and supplies the resulting decoded control signals to the microprocessor 153 or to any of a number of other controllable devices disposed within the IRD modules 106.

In another embodiment, two of the IRD modules 106 may both be configured to provide signals to the same television set 140 thereby enabling the reception of two satellite-provided programming channels on the television set 140 to effect, for example, picture-in-picture viewing or to enable the recording of one program while viewing another. To operate this picture-in-picture system, a single remote control device 152 may be programmed and configured to control both of the IRD modules 106. For example, the hand-held remote control device shown in FIG. 5 may be modified to include a first and a second remote code select switch 196 wherein the first and second remote code select switches are each programmed with unique codes each of which correspond to a different one of the IRD modules 106 to be controlled. The hand-held remote 152 may further be equipped with a selection button or switch that is used to select the module 106 to be controlled by coupling the appropriate one of the first or second remote code select switches to the RF modulator used to convert and encode the signals prior to transmission to the IRD modules 106. Alternatively, two of the remote control devices 152 may be programmed and configured such that a first of the two, remote control devices 152 controls one of the IRD modules 106 and a second of the remote control devices 152 controls the other IRD 106 and the signals provided by both IRD modules 106 are received at the same television set.

Figure 9:
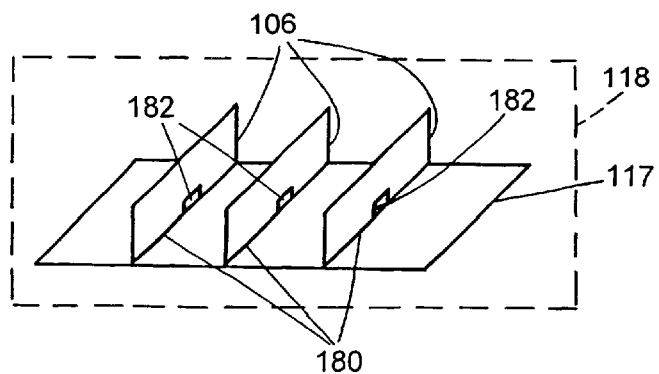
FIG. 9 is a block diagram illustrating a chassis that may be used to support the plurality of modified IRD modules shown in FIG. 3.

Referring now to FIG. 9, the chassis 118 of the present invention, which may reside in the attic, basement or a closet of the home 104, includes a motherboard 117 having a plurality of slots 180 for receiving the IRD modules 106. To enhance versatility, preferably, the motherboard 117 will have approximately four such slots 180 into which the IRD modules 106 may, but need not be inserted thereby allowing the home subscriber to purchase as few or as many IRD modules 106 as needed to meet family viewing preferences. Each slot 180 includes a fastener such as, for example, a screw or snap lock (not shown) that retains the IRD module 106 in the slot 180. Each slot 118 further includes a plurality of ports 182 that enable signal interface (i.e., electrical signals or data signals) between the motherboard 117 and the IRD modules 106. In addition, each IRD module 106 preferably includes a plurality of ports that cooperatively align with the signal interface ports 182 located in each slot 180 when the IRD module 106 is inserted into the receiving slot 180. For example, one of the signal interface ports 182 may supply electrical power, while another of the signal interface ports 182 may supply satellite television signals to the IRD 106.

The chassis 118 within which the motherboard 117, IRD modules 106 and other componentry described herein are disposed may be attractively designed for integration into a single family home entertainment system. Alternatively, the chassis 118 may be weatherproof to protect the IRD modules 106 from exposure to the elements in the event that the chassis 118 is placed outdoors on, for example, the roof top of the family home 104.

Figure 10:
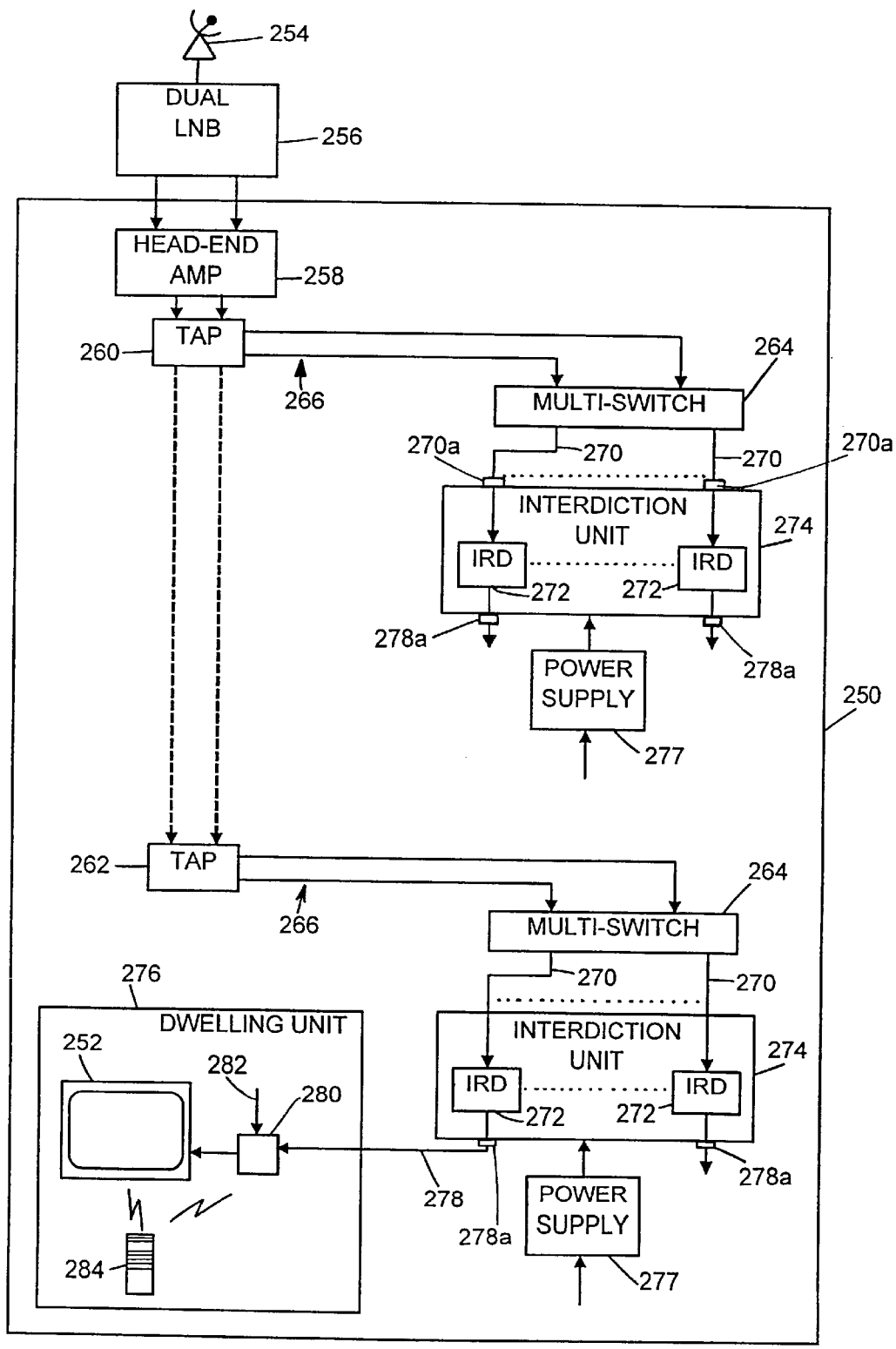
FIG. 10 is a block diagram of a second signal distribution system embodying the present invention, and adapted to provide satellite television programming to a multiple-dwelling-unit (MDU).

Referring now to FIG. 10, in still another embodiment, the present invention may be adapted to provide satellite television programming to a plurality of television sets, one of which is shown at reference numeral 252, in a multiple dwelling unit 250. A satellite antenna 254 provides the satellite television signals to a dual LNB 256 that transmits right-hand and left-hand polarized satellite signals to a head end amp 258. The head end amp 258 amplifies the signal strength for subsequent transmission through a series of taps beginning with a first tap 260 located on a first floor of the MDU 250. The first tap 260 relays the satellite signals to a second tap 262 located on a second floor of the MDU 250. Note that although only the taps 260 and 262 are shown, the distribution system ideally includes a separate tap for each floor of the MDU 250. The taps 260 and 262 route the satellite signals to a plurality of multiswitches 264 via a set of trunk lines 266. The multiswitches 264 provide the satellite signals via a plurality of output lines 270 to input ports 270a of an interdiction unit 274. The input ports subsequently provide input to a plurality of IRD modules 272 disposed in the IRD interdiction unit 274. Each IRD module 272 provides an output signal to an output port 278a. Each output signal is thereafter independently routed via a coaxial cable distribution system 278 to a different television set 252 located in a different one of a plurality of subscriber dwellings, one of which is shown at the reference numeral 276. Ideally, pre-existing Cable TV programming coaxial cable distribution systems that are typically available in MDUs and that are used to independently route Cable TV programming to individual dwelling units may be adapted for use as the coaxial cable distribution system 278 of the present invention.

Referring still to FIG. 10, the multiswitch 264 responds to voltage select and/or other select signals impressed by the IRD modules 272 on the lines 270 by providing the selected right or left hand signal to the IRD modules 272. The IRD modules 272 process the received satellite signals and are each equipped with an RF modulator 326 (shown in FIG. 11) for converting the satellite signals to RF video signals that contain the satellite television programming. As described hereinbefore, each IRD module 272 provides the resulting RF video signal to a separate one of the plurality of subscriber dwelling units 276 where it is received at a transceiver unit 280 (see FIG. 10). To minimize signal degradation caused by the transmission of the RF signal over the potentially long cable run between the IRD interdiction unit 274 and the subscriber dwelling unit 276, the RF signal is preferably transmitted at a low frequency channel such as, for example, channel 3 or 4.

The transceiver unit 280, which also receives off-air and cable programming signals from an alternate feed 282, responds to a viewer operated remote control device 284 to send either the IRD-provided RF video signal or the off-air/cable TV programming signal to the television 252.

Figure 11:
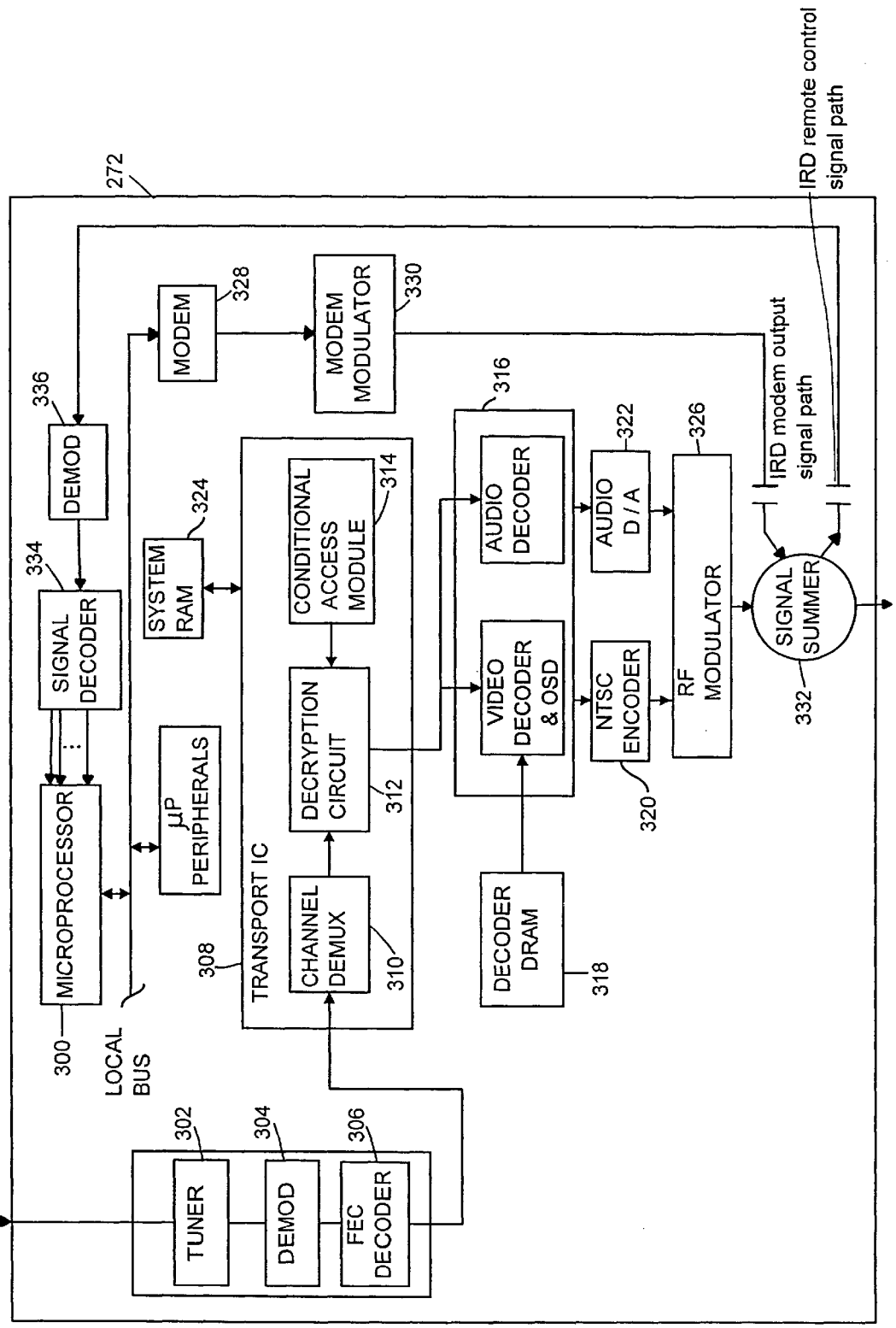
FIG. 11 is a block diagram of an IRD module adapted for use with the present invention that is coupled to the MDU signal distribution system shown in FIG. 10, and that uses a video cable as a remote control signal return path.

Referring now to FIG. 11, each of the modified satellite IRD modules 272 is equipped with many of the same components found in the IRD 106 of the preferred embodiment shown in FIGS. 3 and 4A including, a microprocessor 300, a tuner 302, a demodulator 304, an FEC decoder 306, a transport IC 308 having a channel demultiplexer 310, a decryption circuit 312 and a conditional access: module 314; a video and audio decoder 316 with a DRAM 318; an NTSC encoder 320, an audio digital to analog converter 322 and a system RAM 324. The foregoing list of components all operate to process the satellite television signals in the same mariner as the IRD 106 of FIG. 4A.

However, the IRD modules 272 include a conventional channel 3/4 RF modulator 326 rather than the frequency agile RF modulators 176 of the IRD 106 (see FIG. 4A). In addition, since each of the IRD modules 272 in a multiple dwelling unit will most likely service a different subscriber family, the single modem design of FIG. 3 is not used. Instead, each IRD 272 is equipped with a modem 328 for reporting billing information and a modem modulator 330. The microprocessor 300 supplies the billing information and data to the modem 328. The modem 328, in turn, transmits the data to the modem modulator 330 which modulates the signal to a low unused frequency spectrum below 50 MHZ, e.g. 10 MHz. The down-converted 10 MHz information signal is thereafter combined with the RF video signal provided by the RF modulator 326 at a signal summer 332 for subsequent transmission to the dwelling unit 276 (see FIG. 10) via the coaxial RG6 cable distribution system 278. A signal decoder 334 receives demodulated control signals from a control signal demodulator 336, which signals are used to effect control of the microprocessor 300. The control signal demodulator 336 receives the control signals from the signal summer 332 which is coupled to the transceiver unit 280 via the cable 278 (see FIG. 10). The origin of the control signals within the transceiver unit 280 is described hereinafter in conjunction with the description of the internal circuitry of the transceiver unit 280.

Figure 12:
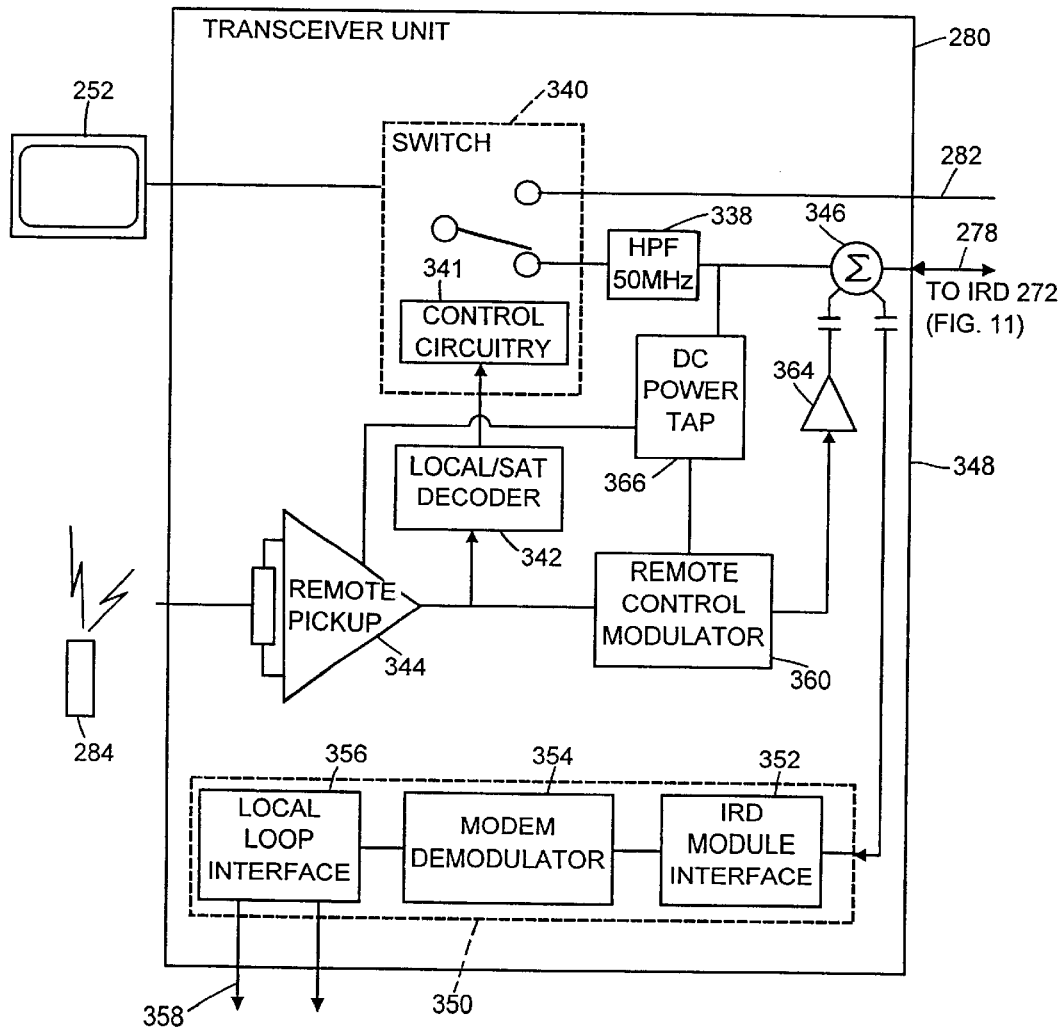
FIG. 12 is a block diagram of a transceiver unit for use with the IRD module and MDU signal distribution system shown in FIGS. 11 and 12.

Referring now to FIG. 12, the transceiver unit. 280 receives the combined RF video signals and billing information signals transmitted via the cable 278 at a high pass filter 338 which blocks out all signals having a frequency lower than 50 MHz. The IRD-provided signal is then delivered to a single pole double throw (SPDT) switch 340 or the equivalent which also receives off-air and cable TV programming from the cable 282. The switch 340 which includes control circuitry 341 is controlled by the local/ satellite decoder 342 that responds to control signals detected by a remote pick up amplifier 344 to cause the switch control circuitry 341 to select either the off-air/cable TV programming or the satellite television programming for delivery to the television 252. Of course, it should be understood that the television set 252 includes conventional display and tuning circuitry (not shown) to enable the selection and display of a particular program on the television monitor.

The billing information from the IRD-provided signal is routed via the input video cable line 348 to a modem demodulation circuit 350 where an IRD module interface circuit 352 transmits the signal to a modem demodulator 354. The modem demodulator 354 demodulates the information signal to a format that is suitable for modem communication and then transmits the signal to a local loop interface circuit 356 that is coupled to a local telephone network (not shown) via the subscriber's telephone line 358.

Referring now to FIGS. 10, 11 and 12, to control the IRD 272 the transceiver unit 280 is equipped with a remote control modulator 360 that converts signals generated by the remote control device 284 and detected at the remote pickup amplifier 344 into signals having a frequency less than 50 MHz. A driver circuit 364 amplifies the converted signals that are then output to a signal combiner 346 for transmission over the cable 278 to the IRD 272. The control signals are thereafter routed via the signal summer 332 to the demodulator 336 which demodulates the control signals and supplies them to the signal decoder 334. Since the use of splitters or amplifiers prevents bidirectional signal flow, it will be understood by one having ordinary skill in the art that the cable 278 can be used to transmit the control signals from the transceiver unit 280 back to the IRD 272 only in the event that such amplifying or signal splitting components are not interposed between the transceiver unit 280 and the IRD 272.

Referring now to FIG. 10 and FIG. 12, the system is continuously powered by a set of power supplies 277 that are each coupled to a separate one of the IRD interdiction units 274. Due to the low power consumption ratings of the IRD modules 272, the continuously powered interdiction units 274 are not subject to overheating.

A DC power tap 366 disposed within the transceiver unit 280 is coupled to the line 278 to extract power from the IRD 272 which is thereafter used to bias all active circuits in the transceiver unit 280.

In some instances, the MDU subscriber may prefer to have the satellite IRD 272 located in his dwelling unit rather than remotely located in the MDU interdiction unit 274. For example, the viewer may prefer to have the stereo satellite signal (instead of the mono RF signal) provided to at least one most-often used television set. To accommodate these preferences, the embodiment of FIG. 10 may be altered by installing the IRD 272 in the desired television set 252 instead of the remotely located interdiction unit 274. To route the satellite signal directly to the subscriber dwelling unit 276, a short coax cable is used that connects the output of the tap 260 to a cable capable of satellite signal transmission which provides the signal to the IRD 272 that has been relocated in the television set 252 of the subscriber dwelling unit 276.

Figure 13:
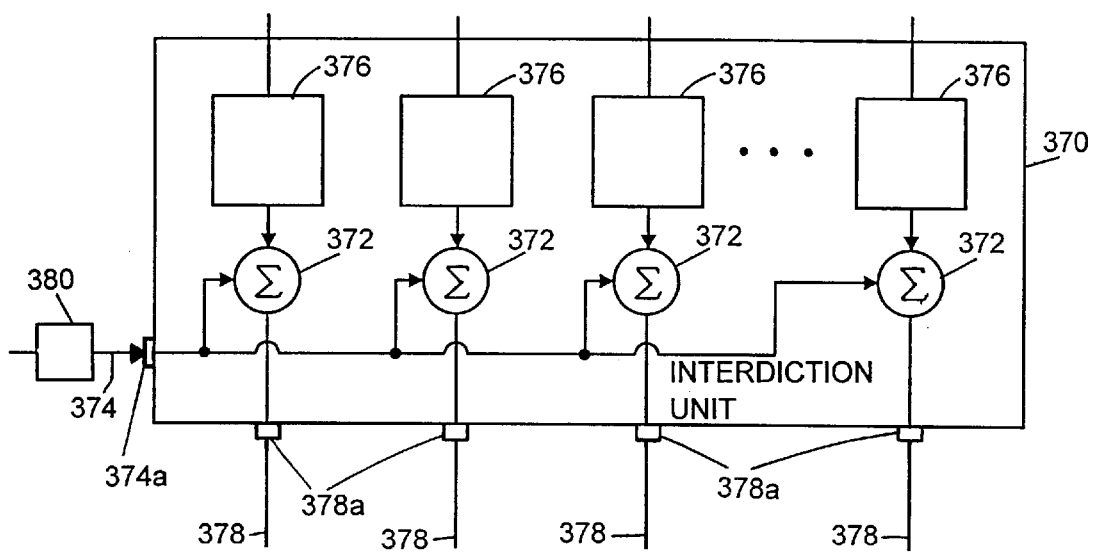
FIG. 13 is a block diagram of an alternative interdiction circuit for use with the MDU signal distribution system shown in FIGS. 11 and 12.

Referring now to FIG. 13, the satellite distribution system adapted for the multiple dwelling unit 250 may be altered such that the off-air/cable TV programming is combined with the IRD-provided satellite signal at the IRD interdiction unit 274 instead of at the transceiver unit 280 (see FIGS. 10 and 12). In this embodiment, the IRD interdiction unit 274 is replaced with the IRD interdiction unit 370. The interdiction unit 370 includes a set of signal combiners 372 that receive a TV/off-air programming signal at an input port 374a disposed on the interdiction unit 370. The signal combiners 372 combine the TV/off-air programming signal which is transmitted via cable 374 with the RF video signal containing satellite television programming provided by one of a set of IRD modules 376 and then supplies the combined signal to an output port 378a for subsequent transmission to the subscriber dwelling (not shown) via a cable 378. A trap 380 separates out any cable TV signals or off-air signals residing on the channel at which the satellite programming is transmitted, such as, for example, channels 3 or 4, or relocates any such signals to another frequency to prevent interference between the satellite and cable TV/off-air programming. If this configuration is used, the IRD modules 376 are identical in design and circuitry to the IRD modules 272 shown in FIGS. 10 and 11. Alternatively, instead of using a trap to prevent channel interference, the RF modulator residing in the IRD 376 may be replaced with a frequency agile RF modulator that converts the selected programming to an unused frequency prior to providing the signal to the signal combiner 372. Note that in this embodiment, the transceiver unit 280 (see FIGS. 10 and 12) need not have a switch 340 for switching between the off-air/cable TV programming and the satellite programming since both signals are provided on the same cable.

Figure 14:
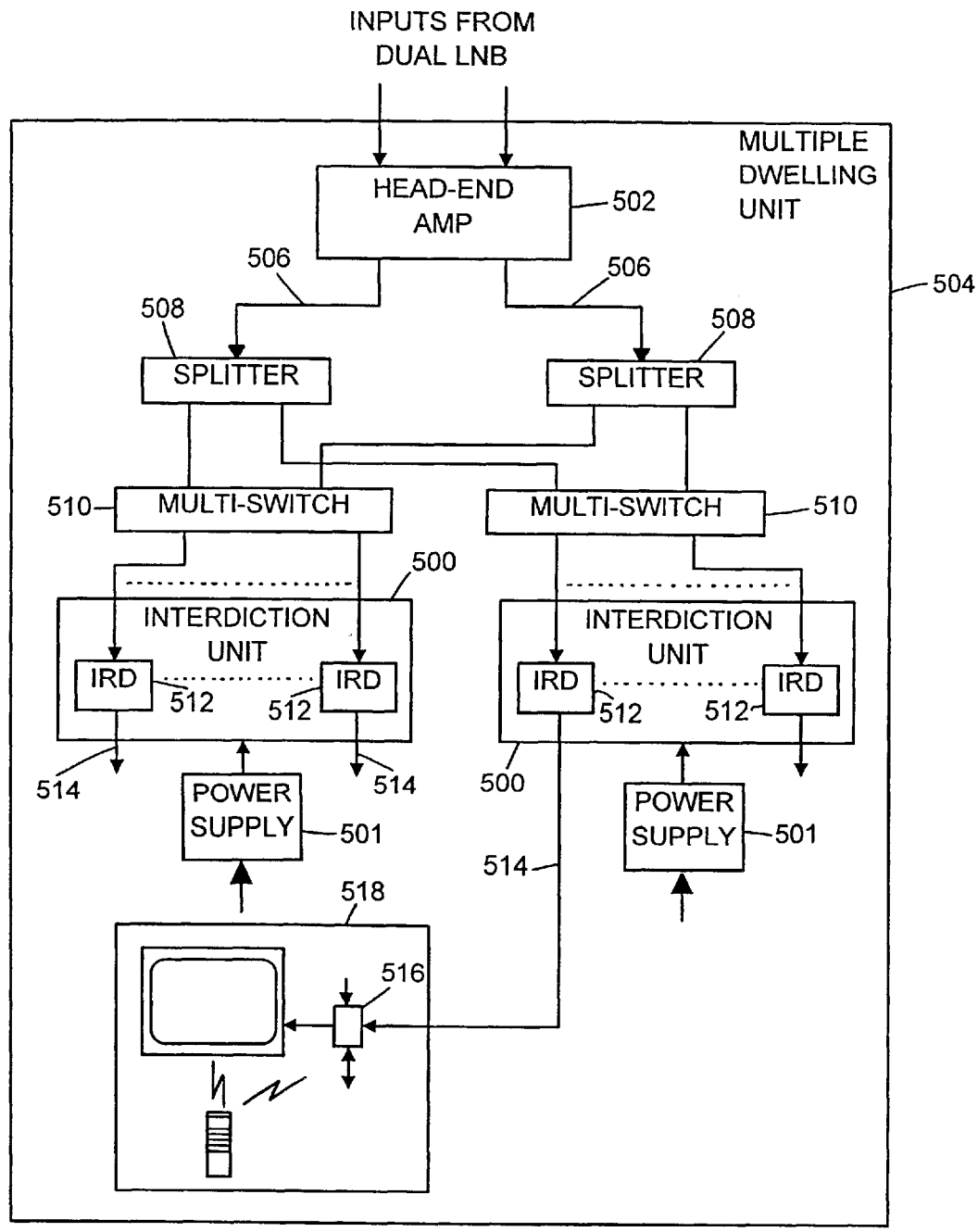
FIG. 14 is a block diagram of a third signal distribution system embodying the present invention, and adapted to provide satellite television programming to a multiple-dwelling-unit (MDU).

To eliminate the signal degradation that may occur in the embodiment shown in FIG. 10 when transmitting the 950–1450 MHz satellite signal over the trunk lines 266 on each floor of the MDU 250, an alternate embodiment shown in FIG. 14 is provided in which the interdiction units 500 are physically located near a head end amp 502 instead of on separate floors of the MDU 504. A satellite signal is received at an antenna (not shown) disposed on the exterior of the MDU 504. The signal is then processed by a dual LNB (not shown) that feeds the resulting right-hand and left-hand satellite signal components to a headend amp 502. The headend amp 502 strengthens the signal for transmission via a set of lines 506 to a set of splitters 508. The splitters 508 are coupled to a plurality of multiswitches 510 which provide the signals to the plurality of IRD interdiction units 500 that are each powered via a power supply 501. As will be understood by one having ordinary skill in the art, by locating the IRD interdiction units 500 at a location that is physically near the headend amp 502, the length of the cable 506 required to transmit the satellite signal is decreased thereby minimizing signal degradation associated with the transmission of the satellite band signals over long distances. The IRD modules 512 disposed within the IRD interdiction units 500 operate in the same manner as the IRD modules 272 described with respect to the embodiment shown in FIG. 10, i.e., to process and convert the satellite signals to RF video signals for transmission via a plurality of cables 514 that are suitable for RF signal transmission to a plurality of transceiver units 516 each of which are located within a separate one of a plurality of subscriber dwelling units 518.

It will be understood by one of ordinary skill in the art that the interdiction units represented by reference numerals 274 and 500 may also be disposed within the chassis of FIG. 9.

As described previously, although the preferred embodiment of the present invention is described in the context of a high powered DTH system of the type shown in FIGS. 1 and 2, alternative embodiments may have applicability to other distribution systems as well. For example, other embodiments may be used to support any information signal distribution system in which a primary information signal is supplied to a central unit and wherein the central unit distributes the signal to at least one or more service areas wherein individualized control of the central unit is required at each service area.

While the present invention has therefore been described with reference to specific examples, which are intended to be illustrative only, and not to be limiting of the invention, it will be apparent to those of ordinary skill in the art that changes, additions, and/or deletions may be made to the disclosed embodiments without departing from the spirit and scope of the invention.

What is claimed is:

1. In a transmission system in which digital television signals are transmitted to a plurality of user locations, wherein each of said user locations includes a plurality of service areas therein, a television signal distribution system at one or more of said user locations and comprising:

a central unit having a primary television signal input port that receives primary digital television signals, said primary digital television signals comprising a plurality of primary digital television signal components;

said central unit further having at least one output port that outputs to a distribution network selected ones of said plurality of primary digital television signal components for distribution to each of the plurality of service areas; and said central unit having signal processing circuitry that receives said primary digital television signal, along with a plurality of coded user selection signals, each including a coded portion;

said signal processing circuitry further comprises a remote interface circuit that receives said coded portion of said coded user selection signals;

said remote interface circuit comprising a plurality of demodulators;

said remote interface circuit further comprising a plurality of remote code select switches coupled to said demodulators wherein said remote code select switches restrict the operation of said demodulators; and wherein said demodulators selectively distribute a decoded signal to said decoder modules and said signal processing circuitry processing said primary digital television signal based on said user selection signals, along a plurality of parallel and independent signal paths to independently and in parallel provide any one of said primary digital television signal components to said at least one output port, said signal processing circuitry comprises decoder modules for each of said plurality of parallel and independent signal paths, said decoder modules independently and in parallel decoding said primary digital television signal to provide any one of said primary digital television signal components to said at least one output port; and wherein said user selection signals comprise a user selection component that identifies one of the plurality of primary digital television signal components and wherein the coded portions of said user selection signals identify one of said plurality of parallel and independent signal paths.

2. The television signal distribution system of claim 1 further comprising:

a plurality of remote user interface units located in at least some of said service areas;

said remote user interface units receiving said coded user selection signals and providing them to said central unit; and said remote user interface units comprising a remote code select switch.

3. The television signal distribution system of claim 2 wherein said signal processing circuitry further comprises at least one shared-resources module that generates shared resources that are shared among said decoder modules.

4. The television signal distribution system of claim 3 wherein said shared resources comprise power resources.

5. The television signal distribution system of claim 3 wherein said shared resources comprise conditional access resources that determine what primary digital television signal components said signal processing circuitry is authorized to receive.

6. The television signal distribution system of claim 3 wherein said shared resources comprise modem resources that provide access to a telephone line for transmitting information gathered by said signal processing circuitry.

7. The television signal distribution system of claim 6 wherein one of said decoder modules is adapted to retrieve data from said decoder modules and is further adapted to supply said data to said telephone line via said modem resources.

8. The television signal distribution system of claim 2 wherein said signal processing circuitry further comprises a signal combiner that combines the selected primary digital television signal components decoded by said decoder modules and provides a combined signal to said central unit output port and said distribution network.

9. The television signal distribution system of claim 8 wherein:

said central unit further comprises at least one auxiliary input port that receives auxiliary information signals; and said signal combiner also combines said auxiliary information signals such that said combined signal comprises said selected primary digital television signal components decoded by said decoder modules and said auxiliary information signal.

10. The television signal distribution system of claim 9 wherein said auxiliary information signal comprises an off-air broadcast television signal.

11. The television signal distribution system of claim 9 wherein said auxiliary information signal comprises a cable television signal.

12. The television signal distribution system of claim 2 wherein:
said primary digital television signal comprises a wide L-band signal; and
each of said decoder modules comprise an agile radio frequency (RF) modulator that modulates said primary digital television signal component to a narrow bandwidth signal.

13. The television signal distribution system of claim 2 wherein said remote user interface units are coupled to a power distribution network, and are adapted to transmit said user selection signals to said central unit via said power distribution network.

14. The television signal distribution system of claim 2 further comprising:
a plurality of hand held units located in at least some of said service areas;
said hand held units being adapted to transmit said user selection signals; and
said hand held units comprising an encoder for encoding said user selection signals.

15. The television signal distribution system as defined in claim 2 further comprising:
a plurality of signal combiners, each of said signal combiners being coupled to a different, selected one of said decoder modules;
wherein said central unit further comprises at least one auxiliary input port that receives auxiliary information signals; and
wherein each of said signal combiners are adapted to combine said primary digital television signal components with said auxiliary information signals and to provide a combined signal to said at least one output port and to said distribution network.

16. The television signal distribution system as defined in claim 2 wherein:
said central unit further comprises a plurality of slots for receiving said plurality of decoder modules wherein each of said slots comprises a plurality of signal ports.

17. The television signal distribution system of claim 1 wherein:
said at least one user location comprises a single family dwelling unit; and
said plurality of service areas comprise rooms in said single family dwelling unit.

18. The television signal distribution system of claim 1 wherein:
said at least one user location comprises a multiple-dwelling-unit building; and
said plurality of service areas comprise dwelling units of said multiple dwelling-unit building.

19. The television signal distribution system as defined in claim 1 further comprising:
a plurality of display devices wherein at least one of said display devices is located at one of said user locations; and
wherein said display devices are adapted to receive said primary digital television signal components from said at least one output port.

20. The television signal distribution system as defined in claim 1 wherein said central unit further comprises:
a plurality of signal combiners, each of said signal combiners being coupled to a different selected one of said decoder modules;
wherein said central unit further comprises at least one auxiliary input port that receives auxiliary information signals; and
wherein each of said signal combiners is adapted to combine said primary digital television signal components with said auxiliary information signals and to provide a combined signal to said at least one output port and to said distribution network.

21. The television signal distribution system as defined in claim 20 further comprising a filter coupled to said auxiliary input port for filtering said auxiliary information signal.

22. The television signal distribution system as defined in claim 21 further comprising:
a plurality of transceiver units located in at least one of said service areas;
said transceiver units being coupled to said distribution network and being adapted to receive said primary digital television signal components from a specific one of said decoder modules; and
said transceiver units being adapted to receive an auxiliary information signal.

23. The television signal distribution system as defined in claim 22 wherein said transceiver unit comprises:
a selector circuit that selects between said primary digital television signal components and said auxiliary information signal;
a signal receiver that receives said user selection signals;
a signal decoder for decoding said user selection signals;
a control circuit responsive to said user selection signals to cause said selector circuit to select between said primary digital television signal and said auxiliary information signal.

24. The television signal distribution system as defined in claim 23 wherein said transceiver unit further comprises:
a signal modulator for converting said user selection signals to a format suitable for transmission over said distribution network;
a transmitter coupled to said signal modulator for transmitting said converted user selection signals via said distribution network to said specific decoder module.

25. The television signal distribution system as defined in claim 24 wherein said decoder modules comprise:
a modem circuit that generates a modem signal;
a signal combiner that combines off-air or cable programming signals provided by an antenna with said primary digital television signal; and
wherein said signal combiner provides a combined signal to said output port and to said distribution network.

26. The television signal distribution system as defined in claim 25 wherein said transceiver unit further comprises a filter that filters said combined signal.

27. The television signal distribution system as defined in claim 25 wherein said transceiver unit further comprises:
a modem interface circuit, that is adapted to receive said combined signal and to separate said modem signal from said combined signal and to convert said modem signal to a format suitable for transmission on a telephone line.

28. The television signal distribution system as defined in claim 22 further comprising:

a power supply coupled to said central unit, said power supply being adapted to provide power to said decoder modules; and wherein said transceiver unit further comprises a power tap that draws power from said distribution network.

29. The television signal distribution system as defined in claim 20 further comprising:

a plurality of distribution centers that receive said primary digital television signal;

a plurality of switches, wherein at least some of said switches are coupled to some of said distribution centers; and a plurality of said central units wherein at least some of said central units are coupled to some of said switches.

30. The television signal distribution system of claim 29 wherein:

said at least one user location comprises a multiple-dwelling-unit building having a plurality of levels; and wherein each of said distribution centers is located on a different one of said levels; and wherein said switch coupled to said distribution center is located on the same level as said distribution center.

31. The television signal distribution system as defined in claim 20 further comprising:

an amplifier that receives said primary digital television signal;

a plurality of splitters coupled to said amplifier that receive said primary digital television signal from said amplifier;

a plurality of switches coupled to said splitters; and wherein one of each of said central units are coupled to a different one of said switches.

32. The television signal distribution system of claim 31 wherein:

said at least one user location comprises a multiple-dwelling-unit building having a plurality of levels; and wherein said amplifier, said splitters, said switches and said central units are located on a first level; and wherein said central units provide signals to said at least one of said dwelling units wherein said dwelling units are not located on said first level.

33. In a transmission system in which digital television signals are transmitted to a plurality of user locations, wherein each of said user locations includes a plurality of service areas therein, a television signal distribution system at one or more of said user locations and comprising:

a central unit having a primary television signal input port that received primary digital television signals, said primary digital television signals comprising a plurality of primary digital television signal components;

said central unit further having at least one output port that outputs to a distribution network selected ones of said plurality of primary digital television signal components for distribution to each of the plurality of service areas; and said central unit having signal processing circuitry that receives said primary digital television signal, along with a plurality of coded user selection signals, each including a coded portion;

said signal processing circuitry further comprises a remote interface circuit that receives said coded portion of said coded user selection signals;

said remote interface circuit comprising a plurality of demodulators;

said remote interface circuit further comprising a plurality of remote code select switches coupled to said demodulators wherein said remote code select switches restrict the operation of said demodulators; and wherein said demodulators selectively distribute a decoded signal to said decoder modules and said signal processing circuitry processing said primary digital television signal based on said user selection signals, along a plurality of parallel and independent signal paths to independently and in parallel provide any one of said primary digital television signal components to said at least one output port, said signal processing circuitry comprises decoder modules for each of said plurality of parallel and independent signal paths, said decoder modules independently and in parallel decoding said primary digital television signal to provide any one of said primary digital television signal components to said at least one output port; and wherein said user selection signals comprise a user selection component that identifies one of the plurality of primary digital television signal components and wherein the coded portions of said user selection signals identify one of said plurality of parallel and independent signal paths, and wherein said remote interface circuit is coupled to a power signal distribution network and is adapted to retrieve said user selection signals from said power signal distribution network.

* * * * *